United States Patent
Hardy et al.

(10) Patent No.: US 7,299,934 B2
(45) Date of Patent: Nov. 27, 2007

(54) PRODUCT SECUREMENT AND MANAGEMENT SYSTEM

(75) Inventors: Stephen Hardy, Wadsworth, OH (US); Adam Gold, Deerfield, IL (US); John Ward, Barrington, IL (US); Max Syvuk, Middleburg Heights, IL (US); John Swafford, Lombard, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 0 days.

(21) Appl. No.: 11/612,210

(22) Filed: Dec. 18, 2006

(65) Prior Publication Data
US 2007/0084812 A1 Apr. 19, 2007

Related U.S. Application Data

(63) Continuation of application No. 11/140,023, filed on May 27, 2005, now Pat. No. 7,150,365, which is a continuation-in-part of application No. 11/047,915, filed on Feb. 1, 2005.

(60) Provisional application No. 60/541,804, filed on Feb. 3, 2004.

(51) Int. Cl.
*A47B 43/00* (2006.01)
*A47F 1/04* (2006.01)

(52) U.S. Cl. ............... 211/59.2; 211/4; 211/211; 211/189

(58) Field of Classification Search ............ 211/59.2, 211/184, 4, 8, 9, 183, 189, 187, 119.003; 312/215
See application file for complete search history.

(56) References Cited

U.S. PATENT DOCUMENTS 2,085,479 A 6/1937 Shaffer (Continued)

FOREIGN PATENT DOCUMENTS

CH 412251 4/1966

(Continued)

*Primary Examiner*—Jennifer E. Novosad
(74) *Attorney, Agent, or Firm*—Banner & Witcoff, Ltd.

(57) ABSTRACT

A system for managing and securing product and deterring theft in a retail setting includes a system that resides either on a standard retailer shelf or may be a stand-alone system. In an embodiment, the system includes a plurality of shelves and product dividers positioned between the shelves and extending from the front edges of the shelves toward the rear of the shelves. Front retaining walls are positioned at the front edges of the shelves and are configured to have a height that inhibits access to products on the shelves. Individual retaining tabs of varying height may be added in front of rows of taller product to inhibit access to these products. In an embodiment, rigid or moveable barriers may be positioned above retaining walls that further restrict access to the products. With the invention, the "sweeping" of numerous products by a thief is deterred. In another embodiment, an alert device may be configured to detect and monitor movement of the moveable barriers and may provide an alert signal corresponding to the management of product on the shelf or corresponding to a potential theft situation. In an embodiment, the alert device may communicate with a security camera to monitor the vicinity and provide a notification to the potential thief that his actions are being monitored and recorded, or provide a notification to store computer, pager, cellular telephone, or the like. In yet another embodiment, lock mechanisms may be used to further secure high-risk theft items. Also, clips or clip members may be incorporated to further secure the product dividers to the shelves. In addition, an adjustable power bar may be included that is adjustable to accommodate the height adjustments made to the shelves.

16 Claims, 15 Drawing Sheets

U.S. PATENT DOCUMENTS

| | | | |
|---|---|---|---|
| 2,110,299 A | 3/1938 | Hinkle | |
| 2,111,496 A | 3/1938 | Scriba | |
| 3,083,067 A | 3/1963 | Vos | |
| 3,285,429 A | 11/1966 | Propst | |
| 3,308,961 A | 3/1967 | Chesley | |
| 3,348,732 A | 10/1967 | Schwarz | |
| 3,452,899 A | 7/1969 | Libberton | |
| 3,652,154 A | 3/1972 | Gebel | |
| 3,815,519 A | 6/1974 | Meyer | |
| 3,830,169 A | 8/1974 | Madey | |
| 3,868,021 A | 2/1975 | Heinrich | |
| 4,300,693 A | 11/1981 | Spamer | |
| 4,303,162 A | 12/1981 | Suttles | |
| 4,331,243 A | 5/1982 | Doll | |
| 4,467,927 A | 8/1984 | Nathan | |
| 4,482,066 A | 11/1984 | Dykstra | |
| 4,504,100 A | 3/1985 | Chaumard | |
| 4,615,276 A | 10/1986 | Garabedian | |
| 4,685,574 A | 8/1987 | Young | |
| 4,706,821 A | 11/1987 | Kohls | |
| 4,724,968 A | 2/1988 | Wombacher | |
| 4,729,481 A | 3/1988 | Hawkinson | |
| 4,730,741 A | 3/1988 | Jackle | |
| 4,762,236 A | 8/1988 | Jackle | |
| 4,811,999 A * | 3/1989 | Remington et al. | 312/249.8 |
| 4,830,201 A | 5/1989 | Breslow | |
| 4,836,390 A | 6/1989 | Polvere | |
| 4,907,707 A | 3/1990 | Crum | |
| 4,934,645 A | 6/1990 | Breslow | |
| 5,012,936 A | 5/1991 | Crum | |
| 5,027,957 A | 7/1991 | Skalski | |
| 5,111,942 A | 5/1992 | Bernardin | |
| 5,123,546 A | 6/1992 | Crum | |
| 5,138,299 A | 8/1992 | Patten et al. | |
| 5,161,702 A | 11/1992 | Skalski | |
| 5,178,258 A | 1/1993 | Smalley | |
| 5,190,186 A | 3/1993 | Yablans | |
| 5,265,738 A | 11/1993 | Yablans | |
| 5,330,058 A * | 7/1994 | Rice | 211/4 |
| 5,332,105 A * | 7/1994 | Stanfield | 211/41.4 |
| 5,341,945 A | 8/1994 | Gibson | |
| 5,366,099 A | 11/1994 | Schmid | |
| 5,390,802 A | 2/1995 | Pappagallo | |
| 5,392,025 A | 2/1995 | Figh et al. | |
| 5,450,969 A | 9/1995 | Johnson | |
| 5,464,105 A | 11/1995 | Mandeltort | |
| 5,469,976 A | 11/1995 | Burchell | |
| 5,542,552 A | 8/1996 | Yablans | |
| 5,562,217 A | 10/1996 | Salveson | |
| 5,634,564 A | 6/1997 | Spamer | |
| 5,673,801 A | 10/1997 | Markson | |
| 5,685,664 A | 11/1997 | Parham | |
| 5,738,019 A | 4/1998 | Parker | |
| 5,746,328 A | 5/1998 | Beeler | |
| 5,797,487 A * | 8/1998 | Young | 206/308.2 |
| 5,839,588 A | 11/1998 | Hawkinson | |
| 6,041,720 A | 3/2000 | Hardy | |
| 6,142,317 A | 11/2000 | Merl | |
| 6,311,852 B1 * | 11/2001 | Ireland | 211/59.2 |
| 6,351,964 B1 * | 3/2002 | Brancheau et al. | 62/249 |
| 6,428,123 B1 | 8/2002 | Lucht et al. | |
| 6,435,353 B2 * | 8/2002 | Ryan et al. | 209/706 |
| 6,513,677 B1 * | 2/2003 | Sorensen et al. | 221/130 |
| 6,651,828 B2 * | 11/2003 | Dimattio et al. | 211/59.2 |
| 6,786,341 B2 * | 9/2004 | Stinnett et al. | 211/59.2 |
| 7,150,365 B2 * | 12/2006 | Hardy et al. | 211/189 |
| 2004/0232092 A1 * | 11/2004 | Cash | 211/4 |

FOREIGN PATENT DOCUMENTS

| | | |
|---|---|---|
| DE | 2825724 A1 | 12/1979 |
| DE | 29902688 U1 | 7/1999 |
| EP | 0337340 | 10/1989 |
| EP | 0398500 | 11/1990 |
| EP | 454586 B1 | 10/1991 |
| EP | 0779047 B1 | 4/2000 |
| FR | 2385365 | 12/1978 |
| GB | 881700 | 11/1961 |
| GB | 2027339 | 2/1980 |
| GB | 2283407 A | 5/1995 |
| WO | 9115141 A | 10/1991 |

* cited by examiner

PRODUCT SECUREMENT AND MANAGEMENT SYSTEM

CROSS REFERENCE TO RELATED APPLICATION

This application is a continuation of U.S. application Ser. No. 11/140,023, filed May 27, 2005, now U.S. Pat. No. 7,150,365, which is incorporated by reference in its entirety herein and which is a continuation-in-part of U.S. application Ser. No. 11/047,915 filed Feb. 1, 2005, which claims benefit to U.S. Provisional Application No. 60/541,804 filed Feb. 3, 2004.

FIELD OF THE INVENTION

The present invention relates generally to shelf assemblies for use in merchandising product and more particularly to shelf assemblies that improve the securement and management of merchandised product.

BACKGROUND OF THE INVENTION

It is known that retail and wholesale stores, such as drug stores, grocery stores, discount stores, toy stores, and the like require and use a large amount of shelving both to store product and to display the product to consumers. In displaying product to consumers to promote and improve store sales, these stores situate or position the product toward the front of the shelf so that the product is visible and easily accessible to consumers. This desirable positioning has certain drawbacks. For instance, with this desirable "front-facing" of product, the stores are finding that relatively small products or packages of high value can be the target of thieves. Certain items can represent a high value to potential thieves who can either resell the items or use them for other illegitimate purposes, as in the case of certain pharmaceutical products. This theft is increasing and is now a significant cost to the retailer because thieves prefer to steal many products at once or in as short amount of time as possible. To do this, for example, thieves will "sweep" the shelf with their arm collecting the items into a purse, bag or coat very quickly and exit the store without drawing attention.

Theft can be the result of both customers and employees actions and has been difficult to eliminate. Attempts to deter and prevent theft have proven to be only partially effective. For instance, in-store cameras often do not observe the theft clearly enough to catch or prosecute the thief. In addition, in-store security personnel are rarely in the correct position to actually observe a thief in action. As a result, theft continues to be a significant problem and cost in the management of product inventory.

The present invention is directed at overcoming these and other known drawbacks and problems with existing shelving systems.

BRIEF SUMMARY OF THE INVENTION

The present invention overcomes the above-mentioned problems by addressing the securement and management of product in a retail setting. As will become evident below, the invention has the ability to inhibit "sweeping" of product by a thief and to limit the taking of large amounts of product from a shelf in a short period of time. Using one or more methods such as placing the shelves closer together, using product dividers that extend from the front edge of the shelf and between the shelves, and placing front walls having a specific height that results in a smaller opening to limit access to product, the present invention will inhibit sweeping of product and the removal of numerous products at a time. The present invention also has the ability to alert store or security personnel and security cameras of a potential theft situation, while minimizing the impact on access to product by legitimate shoppers. By incorporating an alert device that detects movement of a movable barrier installed over the smaller opening above the front wall, the present invention will provide an alert signal indicative of the potential theft of numerous products from the shelf.

Other features and advantages of the invention will become apparent to those skilled in the art upon review of the following detailed description, claims and drawings in which like numerals are used to designate like features.

Figure 1:
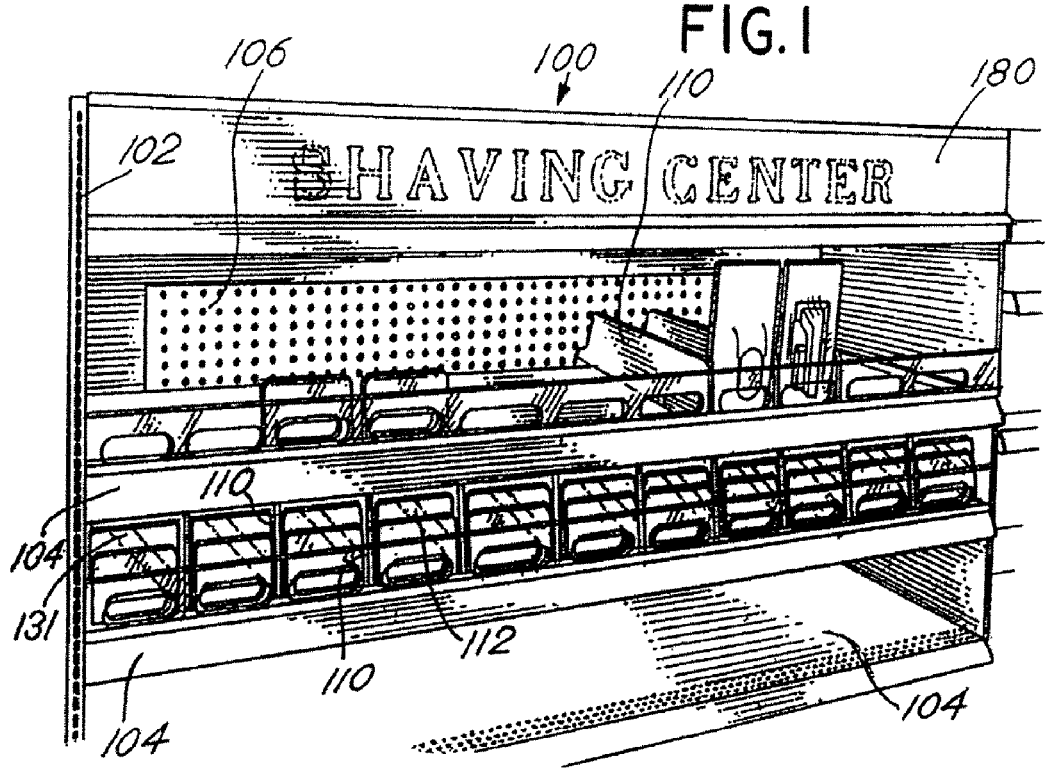
FIG. 1 depicts a front elevation view of an exemplary embodiment of a product securement and management system of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

DETAILED DESCRIPTION OF THE INVENTION

The present invention relates to the securement, management, and distribution of products in settings such as a retail setting and includes numerous embodiments. One embodiment involves a shelf management and display system that resides either on a standard or existing "dealer" shelf typically found in a retail store or on a shelf designed with certain advantages in securing products and deterring theft. The embodiment may include uprights of a pre-existing shelving system or may be a stand alone unit. The display system includes front-facing systems, which force product to the front of a shelf. Such systems may use various methods, such as gravity, friction, magnetism, or spring-urged pushers or paddles to bring product to the front of a shelf near the aisle. Many examples of spring-urged systems that orient products toward the front of a shelf exist and include the systems described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, which are incorporated herein by reference.

Figure 2:
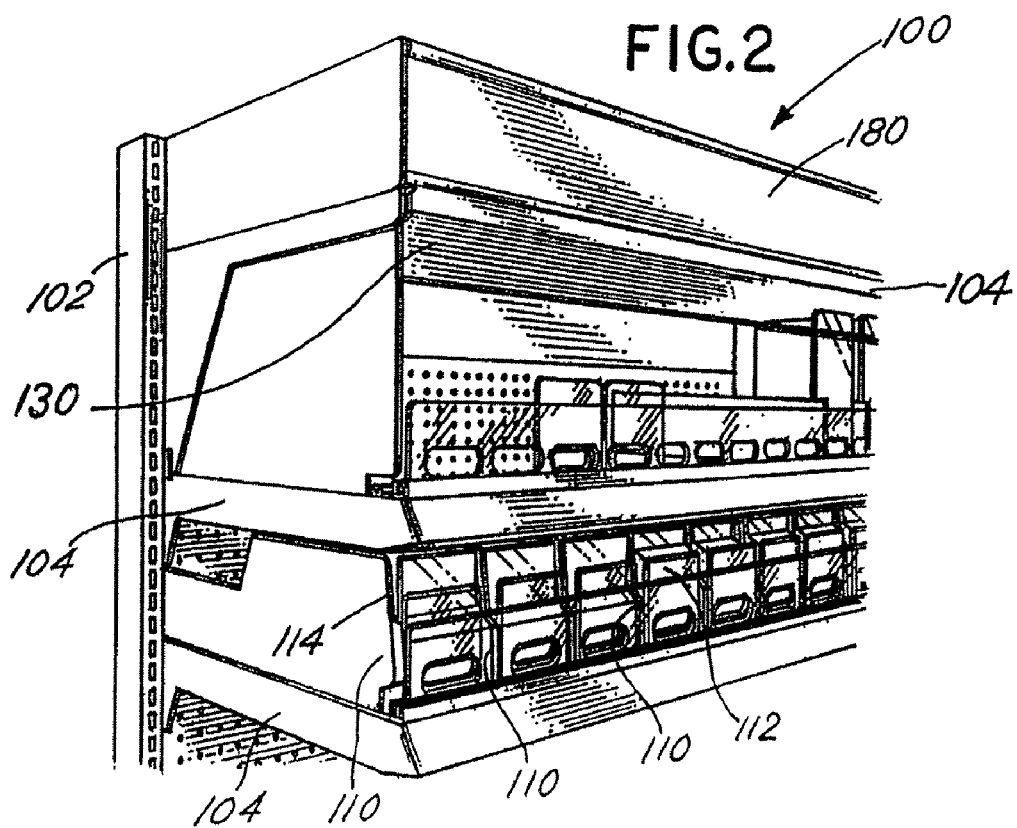
FIG. 2 depicts a partial side elevation view of the exemplary securement and management system of FIG. 1.
Figure 3:
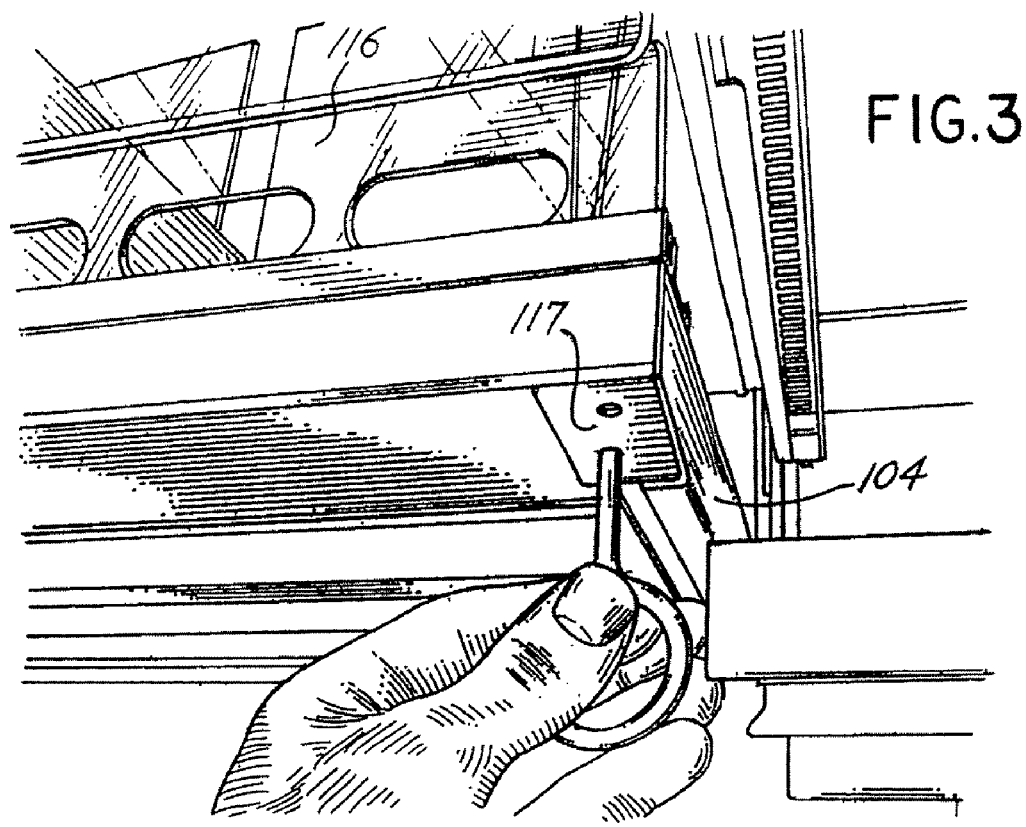
FIG. 3 depicts a bottom view of an exemplary embodiment of a pullout shelf that may be used with the present invention.
Figure 4:
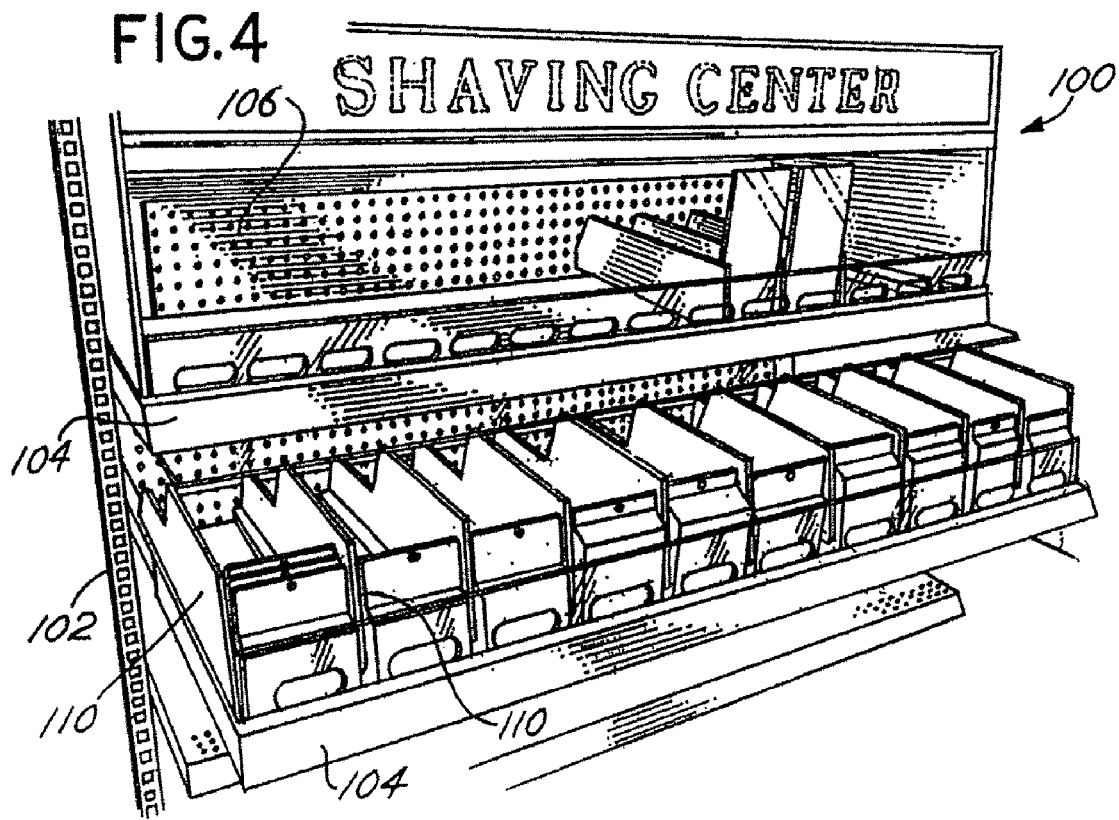
FIG. 4 depicts front elevation view of an exemplary embodiment of the product securement and management system of the invention incorporating the pullout shelf.
Figure 5:
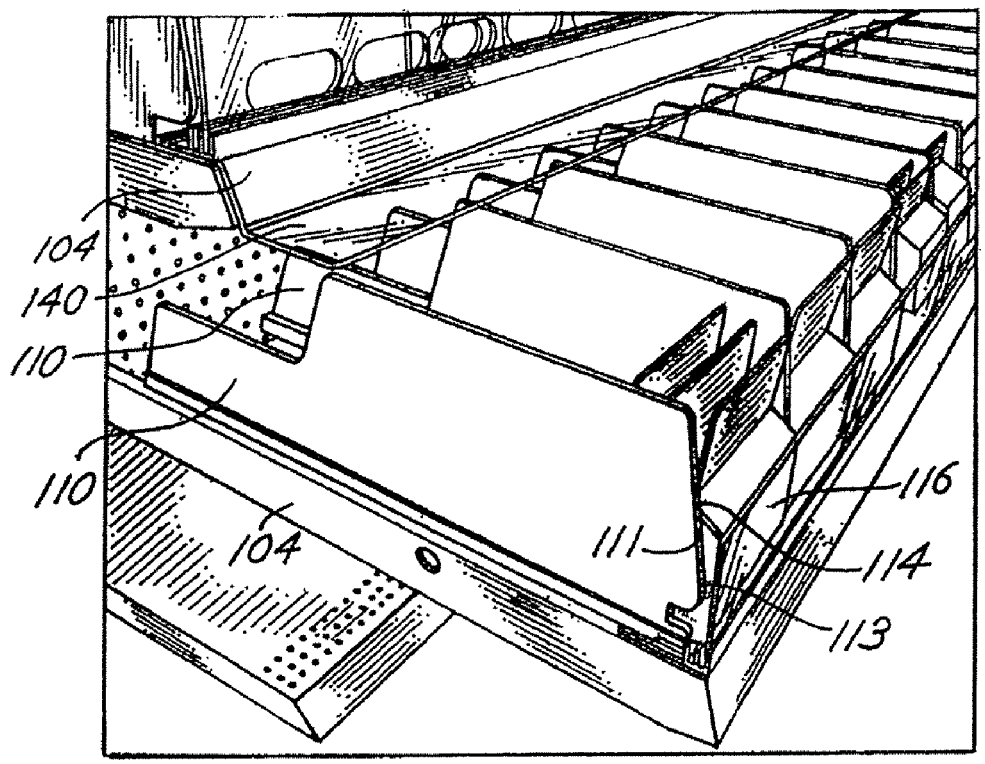
FIG. 5 depicts a side elevation view of an exemplary pullout shelf illustrating the product dividers and the restocking of product on the shelf.

Referring to FIGS. 1 and 2, in one embodiment of the present invention, a shelf management and display system 100 includes vertical uprights 102 and product shelves 104 removably mounted to the uprights. The shelves 104 may be mounted at various positions along the uprights 102 depending on the desired positioning and spacing of the shelves 104. Similarly, the shelves 104 may be moved or relocated to different positions along the uprights 102 as necessary. As shown in FIGS. 4 and 5, the shelves 104 may be pull-out shelves that pull away from the uprights 102 like drawers. As illustrated by FIG. 3, the shelf 104 may incorporate a locking device 117 which involves cooperating catches that contact each other in the locked position and substantially release this contact in the unlocked position and that when released will permit the shelf 104 to pull-out and away from the uprights. The shelves or uprights may involve other locking devices, such as magnets, latches, notches, binders, tension or the like. Once pulled away, the store personnel can restock the shelf with product and then slide the shelf 104 back to its original position and relock the shelf.

A back wall 106 may be mounted to the uprights 102 through known mounting techniques to aid in containing the products and to prevent access to the products from the back of the display system 100. A lock box 108 may be mounted to the uprights 102 also through known mounting techniques. The lock box 108 may be used for storing and locking additional product and shelving components for quick retrieval by the store personnel. The lock box 108 may be positioned at any position on the uprights 102, including the depicted positioning at or near the top of the display system 100. In an alternative embodiment, the lock box 108 may be secured to a shelf 104 as opposed to the uprights 102. With either mounting location, the additional product and shelving components are located at the display system 100 and can therefore be readily retrieved by store personnel.

An exemplary embodiment of the invention may include a series of walls or dividers 110 that are placed between product rows, lanes or facings, and at the ends of the facings, to deter product "sweeping" by a thief. These walls 110 are sometimes referred to as "product dividers." As used herein, the terms "vertical walls," "product dividers" and "dividers" are meant to include any wall (including vertical and non-vertical), divider, barrier, or separator that may be used between product rows, lanes or facings. The product dividers 110, when positioned in a spaced-apart manner on the display system 100, form product lanes 112 for locating and separating product to be merchandised.

The product dividers 110 or side walls also are positioned at the sides of the product facing to prevent access to the product from the side of the display system 100. In one embodiment, these dividers or side walls may include telescoping features that permit them to extend vertically or horizontally to provide additional product securement. Significantly, these dividers or side walls may be used in numerous applications as the size and extent of these can be adjusted to fit most shelves, shelving or display systems, or applications.

Figure 6:
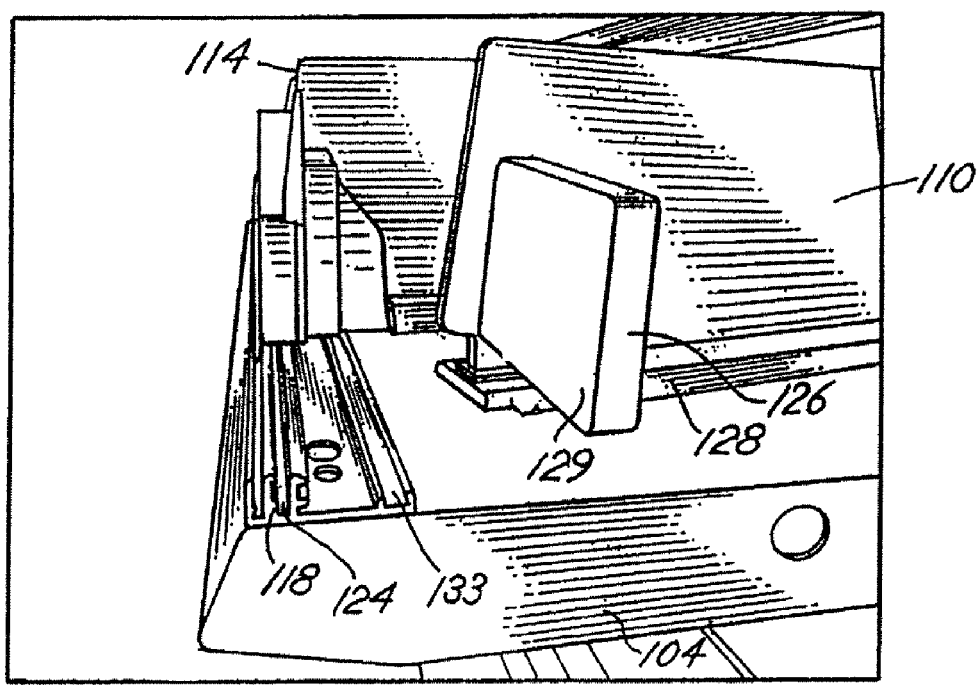
FIG. 6 depicts a side elevation view of an exemplary mounting of a front retaining wall and a secondary retaining wall to the shelf in addition to an exemplary pusher mechanism.

A pusher 126 can be used to urge product forward. This pusher can incorporate a coil spring to assist in urging product forward. The divider 110 in some embodiments can include a base or floor. In some embodiments this floor includes a pusher track 128. FIG. 6 shows the floor on one side of the divider wall. A second floor can be on the opposite side of the divider wall. With floors on both sides of the vertical divider wall, product can rest on these floors. In one such embodiment, a product can rest on one floor of one divider and a second floor of a second divider.

The product dividers 110 define a height, shape and configuration that deter the removal of product over the product dividers 110. The dividers 110 extend in a vertical or non-vertical manner between the shelves 104 and from the front of the shelf 104 to the back wall 106. The dividers 110 have a generally rectangular shape; however, other shapes and configurations of the dividers, such as non-rectangular, oval, repeating patterns or the like, may be used with the invention. Depending on the product to be merchandised and the desired degree of access to the products, the front edge 114 of the product dividers 110 may extend vertically between the shelves 104, or may extend non-vertically to make the products more accessible to the consumer and easier to remove from the shelf. In one embodiment, the divider 110 defines a front edge 111 that includes a front edge portion 113 protruding outward from the front edge 111, as shown in FIG. 5. The protruding portion of the front edge will assist in holding the retaining wall or tab 122 in position to prevent slidable movement of the retaining wall or tab 122, as described below.

The product dividers 110 may be mounted to the display system 100 using numerous techniques. As an example, the dividers 110 may be inserted into tracks formed in the shelf 104 or tracks formed in a base that attaches to the shelf 104. Similarly, the dividers 110 may be formed integral or as a unitary unit with a base that is mounted to the shelf. Also, the dividers 110 may be mounted to a rail, channel, or groove as understood by those skilled in the art. The dividers 110 should be sufficiently rigid to retain the product within the product lanes. Examples of dividers that may be used with invention are described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, which are incorporated herein by reference. One skilled in the art will appreciate that other dividers and techniques for mounting the dividers to the shelves are known and may be used with the teachings of the invention.

In one embodiment, the dividers 110 may have a step down or decline near its rear edge, or a decrease in wall height, to allow the wall 110 to be lifted and disengaged from the rail on which it is mounted. With this configuration, the dividers 110 may be moved laterally without interfering with the shelf above it. In one embodiment, the vertical wall or divider 110 has a step down beginning approximately ⅔ of the wall length from its front edge.

In an embodiment, it may be desired to provide enhanced security for items on only a portion of a shelf. These items may be located in the center of the shelf or on a side of the shelf. Security features such as those referenced herein can be added to only a portion of the shelf, while the remainder of the shelf contains fewer or none of the security features. Where high security items are placed in the center of a shelf, these items can be segregated from the remainder of the shelf through the use of walls. These walls can provide the side barriers for the high security portion of the shelf. These walls can be made of strong construction, such as metal, and can extend from the floor of a shelf to a distance fairly near the top of the shelf. These walls also can be attached to the shelf as well as the other security features to limit the possibility of the walls being bent, removed or otherwise thwarted and to assist in limiting access to the items being merchandised on the shelf.

Figure 25:
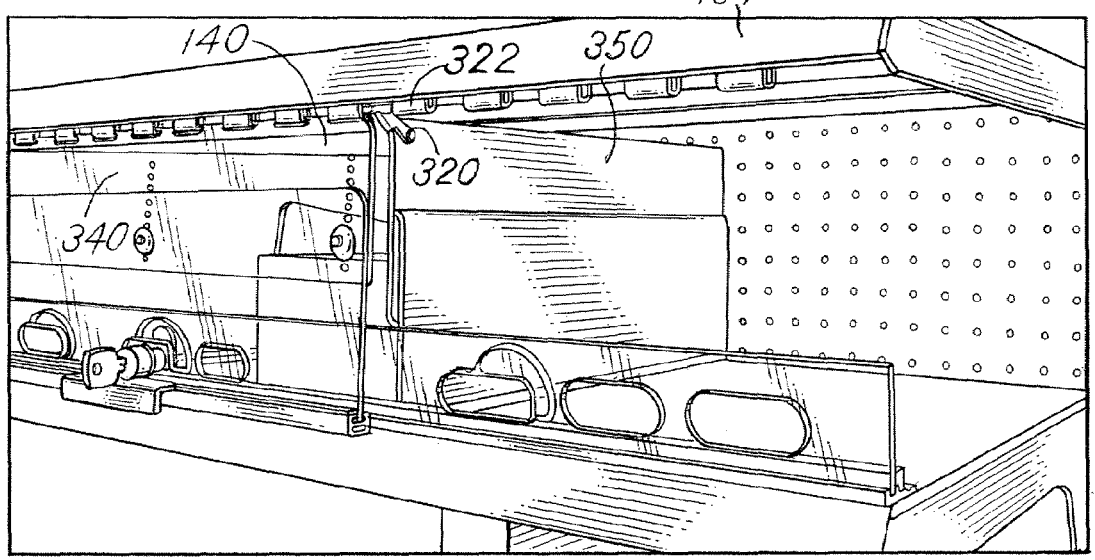
FIG. 25 depicts an exemplary embodiment that includes the use of a clip that may be used to further secure a side wall to the shelf.
Figure 26:
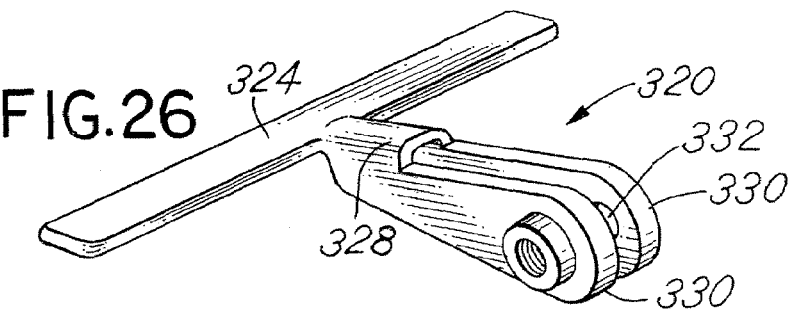
FIG. 26 depicts an isometric view of the clip of FIG. 25.
Figure 30:
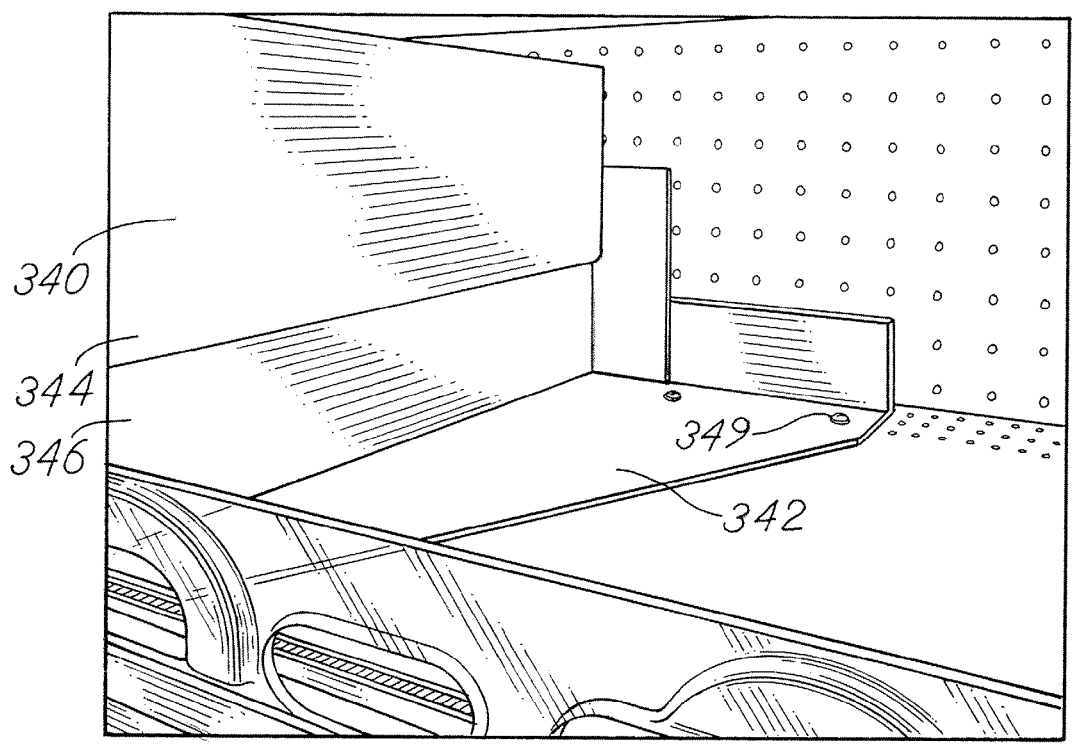
FIG. 30 depicts an exemplary embodiment that includes a side wall that may be used to provide further security for product on a shelf or a portion of a shelf.
Figure 31:
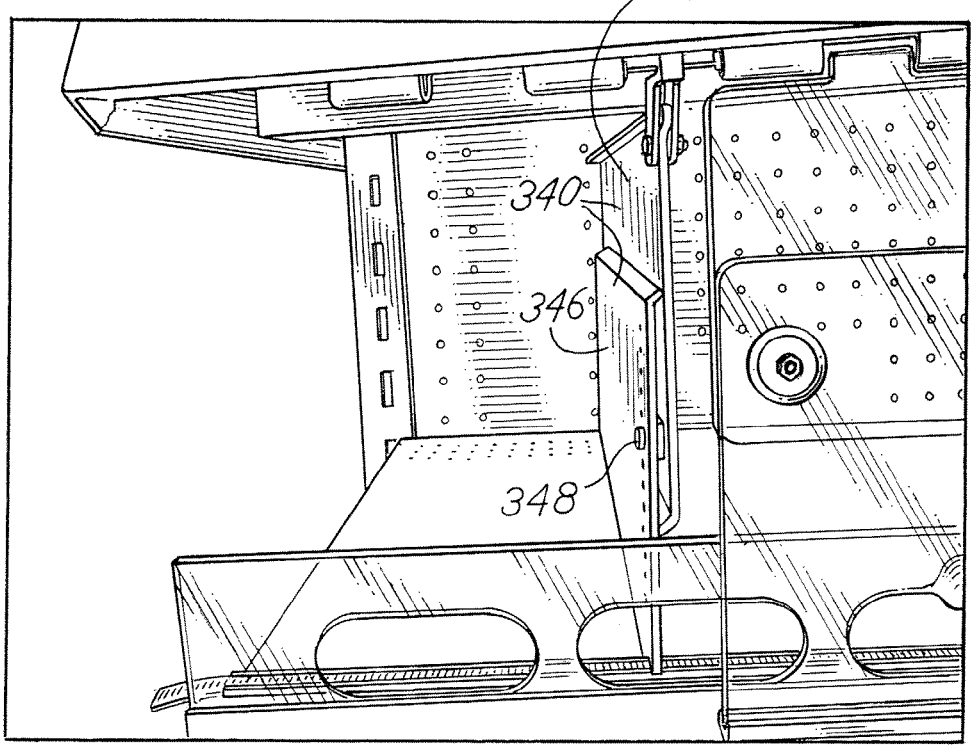
FIG. 31 depicts another view of the wall of FIG. 30.
Figure 32:
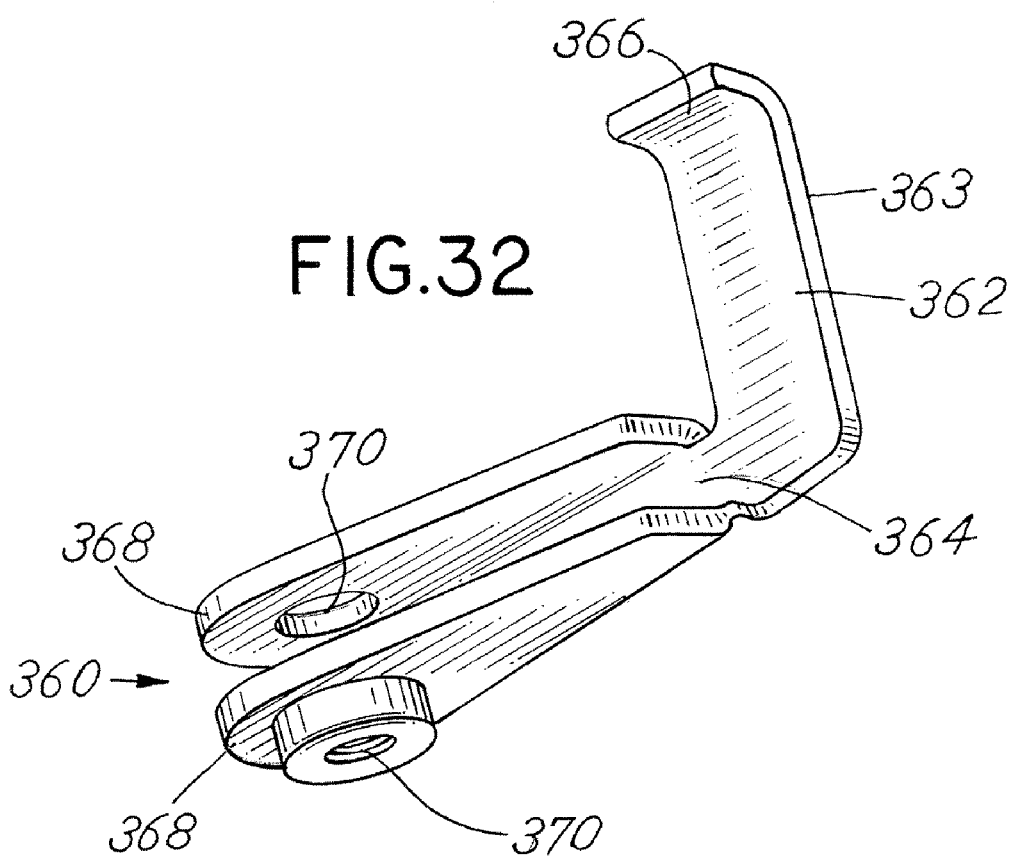
FIG. 32 depicts an isometric view of a clip that may be used to further secure a side wall to the shelf.
Figure 33:
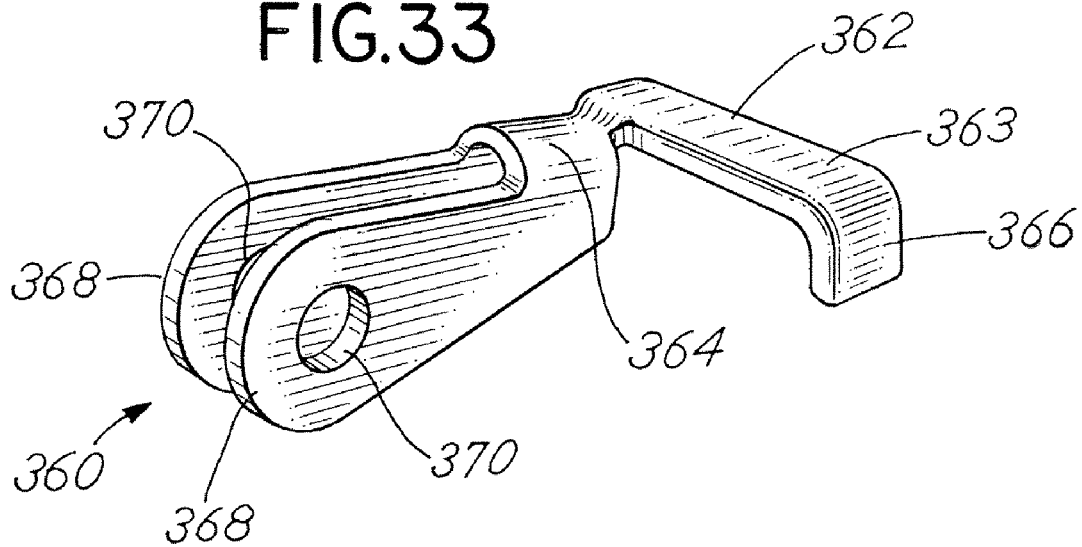
FIG. 33 depicts another view of the clip of FIG. 32.

Referring to FIGS. 25, 30 and 31, walls 340 and 350 are used to segregate a shelf into a higher security area and a lower security area. Walls 340 and 350 can be made from steel and can extend from at or near the floor of the shelf to an area at or near the ceiling of the shelf. The walls also can be adjustable. In an embodiment, the walls can be comprised of a top section 344 and a bottom section 346. As shown in FIG. 31, these two sections can overlap to provide a continuous barrier. The top section 344 of wall 340 and the bottom section 346 of wall 340 can include apertures that align the two walls. A fastener 348 such as a screw, bolt, pin, rod or other fastener can be used to join the two walls at a particular height. The walls also can comprise a floor 342 which includes apertures and can be connected to the floor of the shelf through a fastener 349 such as a screw, bolt, pin, rod or other fastener.

Referring to FIGS. 25-27, 30-33 a clip or clip member 320 or 360 may be used to further secure the wall 340, 350 to the shelf 104 and in particular the walls that separate secure products from non-secure products. The clip 320, 360 also can be used to secure divider 110 to a shelf 104 (embodiment not shown). The clip 320, 360 may be used to strengthen the wall 340, 350 to prevent the bending or moving of the wall. With the use of the clip 320, 360, the wall 340, 350 may be made of a thinner, less costly material because the clip 320, 360 will prevent potential bending or twisting of the wall to access the product on the shelf. The walls 140, 150 also are known as side walls.

Figure 27:
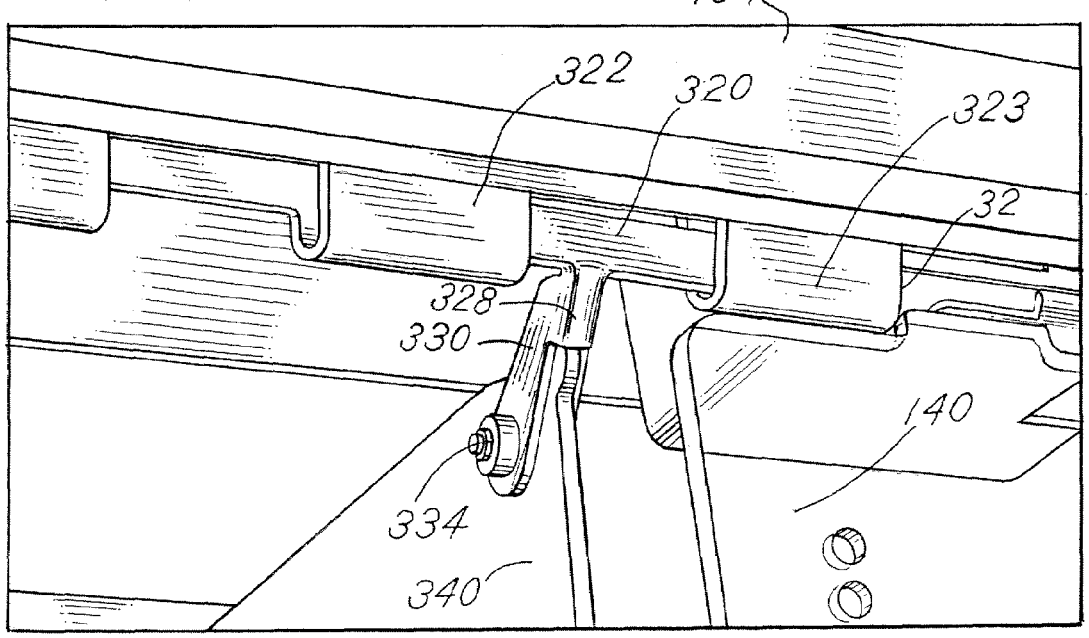
FIG. 27 depicts a close-up view of the mounted clip of FIG. 25.

In an exemplary embodiment, the clip 320, 360 is configured at one end to engage a hinge rail 322, which is used to hinge the barrier 140, discussed below, to the shelf 104. The hinge rail 322 is mounted to a shelf. The clip 320, 360 mounts to the shelf through its interaction with hinge rail 322. The clip 320, 360 is further configured at an opposite end to engage the wall 340, 350. More particularly, the clip 320 includes a blade portion 324 that is configured to engage with the hinge rail 322 and at any of the multiple positions along the hinge rail 322, thus providing flexibility in the placement of the clip 320. The blade portion 324 may take on numerous shapes and configuration and may be connected to or joined with a clip body 328. The clip body 328 is further connected to or joined with opposing wall mounting members 330. The wall mounting members 330 are configured to be positioned on opposing sides of a wall 340 with the wall passing between the mounting members 330. The wall mounting members 330 further define aligned holes 332 for receiving a mounting fastener 334 that may be used to secure the mounting members 330 to the wall 340, as depicted by FIG. 27. The aligned holes 332 may be thru holes or threaded holes. As can be appreciated, any type of fastener or securement technique may be used to secure the clip 320 to the wall 340.

Where a wall 340 or 350 is placed at the side end of a shelf, a clip 360 can be used to further secure the wall 340, 350 to the shelf 104. At the edge of the shelf, the hinge rail ceases (not shown). Clip 360 includes a blade portion 362 that extends in only one direction from the clip body 364. The blade portion 362 is configured to engage the hinge rail 322. In an embodiment, the blade portion engages only a single hinge piece or knuckle of the hinge rail. For example, in FIG. 27, a single hinge piece or knuckle is designated by 323. The blade portion 362 includes a first blade portion 363 and a second portion 366 that can be at an angle to first portion 363. The second portion 366 can be configured to interact with the side 324 of knuckle 323. The blade 362 may take on numerous shapes and configuration and may be connected to or joined with a clip body 364. The clip body 364 is further connected to or joined with opposing wall mounting members 368. The wall mounting members 368 are configured to be positioned on opposing sides of a wall 350 with the wall passing between the mounting members 368. The wall mounting members 368 further define aligned holes 370 for receiving a mounting fastener (not shown) that may be used to secure the mounting members 368 to the wall 350. The aligned holes 370 may be thru holes or threaded holes. As can be appreciated, any type of fastener or securement technique may be used to secure the clip 360 to the wall 340 or 350.

A front retaining wall 116 may be positioned along the front edge of the shelf 104. The front retaining wall 116 can serve as a "fence" to restrain the product in the product lanes 112 and assist in preventing the product from falling off the front of the shelf 104. The retaining wall 116 stops the forward movement of product that is caused by the urging of the pushers, described below. As exemplified by FIG. 6, the retaining wall 116 may be mounted to a channel or rail 118 that extends along the front edge 119 of the shelf 104. The channel or rail 118 may be mounted to existing holes in a standard dealer shelf, or secured by any other known manner to the shelf 104. The retaining wall 116 may be mounted to or on the channel or rail 118. The front retaining wall 116 may be made of a clear plastic to permit visualization of the product on the shelf and provide a more aesthetically pleasing organization to the merchandised product. The front retaining wall 116 can also be created from opaque or semi-transparent material, or from wire, and can be adaptable to display graphics. The front retaining wall 116 can have a variety of configurations, such as rectangular, oblong, repeating patterns or the like.

Figure 7:
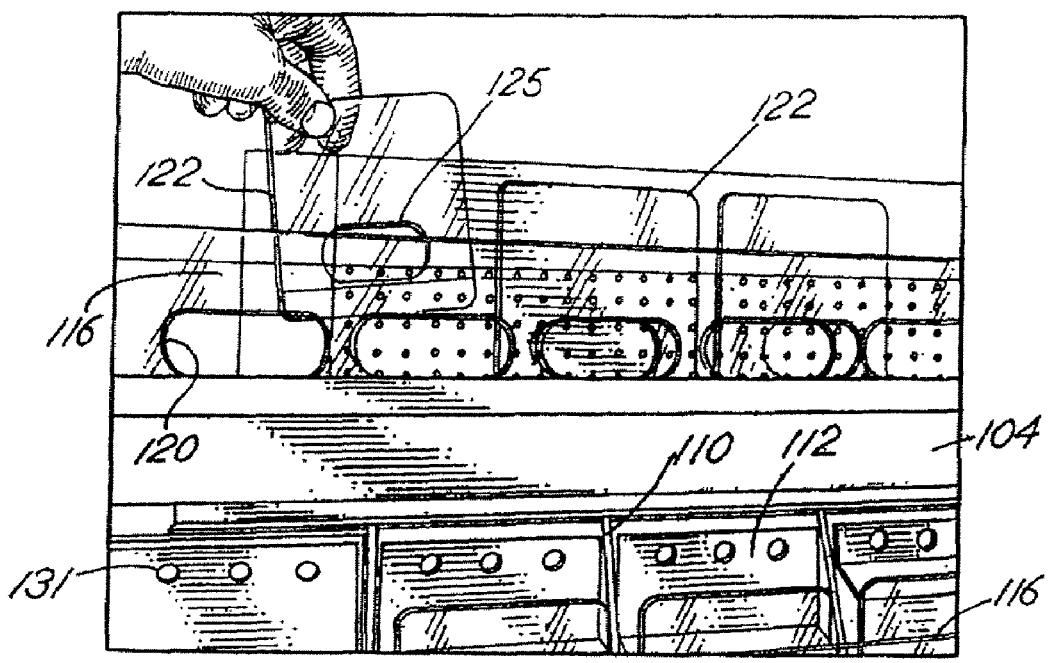
FIG. 7 depicts a front elevation view of an exemplary embodiment of a front retaining wall and a secondary retaining wall.

As more clearly shown in FIG. 7, the front retaining wall 116 may also include holes or openings 120 extending therethrough that are spaced along the wall 116. The holes 120 permit the consumer and store personnel to push the product back and away from the retaining wall 116 for ease of insertion and removal of the product.

As shown in FIGS. 1 and 2, the retaining wall 116 can have a height that permits the removal of a single product at a time or, depending on the desired level of security, a couple of products or a few products at a time. In other words, the height of the retaining wall 116 can permit limited access to and removal of product from the display system 100. Stated another way, the retaining wall 116 is not so tall as to prohibit any access to the product, but is sized to allow the consumer or store personnel to access and lift a limited number of product over the retaining wall 116 at one time. This limited removal of products is accomplished through the use of the retaining wall 116 and the close proximity of the shelf 104 positioned above the product. That is, in one embodiment, the shelf 104 located above the product will be positioned in close proximity to the top edge of the product, or the top edge of the product divider 110, whichever is taller. The shelf 104 located above the product, the product dividers 110, and the retaining wall 116 will form an opening or window 131 through which only a single, two, or possibly a few, product(s) can be removed at one time or in a single motion. This configuration also deters "sweeping" of product from the shelf 104. The size of the window 131 can be adjusted by adjusting the location of the shelf 104 above the product, the dividers 110, and/or the retaining wall 116, or through the use of a second retaining wall 122, barrier 130, and/or barrier 140, described below. This window 131 adjustment permits flexibility with the system and allows the store to set the window 131 size depending on the product size and how many products they want to permit consumers to remove at a time.

In an exemplary embodiment, if taller products are merchandised on the shelves 104, or if a smaller window 131 is desired, a second retaining wall 122 may be positioned behind or possibly in front of the retaining wall 116 to serve as a retainer for the product. As used herein, the second retaining wall 122 may be referred to as a "tab" and may include any retaining structure or "fence" that can be selectively configured or mounted to the shelves 104 to provide selective theft prevention of specific products, such as high theft items. Consequently, the second retaining wall or tab 122 may have many configurations, shapes and designs, and may be used in front of individual rows of product or groups of rows of product.

As shown in FIGS. 6 and 7, the second retaining wall or tab 122 may be mounted to or on a second channel or rail 124 that extends parallel with the channel or rail 118. The retaining wall or tab 122 may be slidable relative to the shelf 104 or rail 124, or may be fixed relative to the shelf 104 or rail 124. The tab 122 can be positioned between adjacent dividers 110 and held in position between the dividers 110. In other words, the tab 122 may not be permitted much slidable movement in or on the channel or rail 124 because the dividers 110 will hinder such slidable movement. In some embodiment, the dividers 110 contain a portion that serves as a stop to prevent the tab or first retaining wall from moving laterally. Such configuration further prevents theft of the product as potential thieves will not be permitted to simply slide the tab 122 to the side and remove numerous products at a time.

The second retaining wall or tab 122 will have a height that permits access to and removal of a limited number of product. If desired, the tab 122 may have a height that permits removal of only one product at a time. With the use of tabs 122, the display system 100 will have flexibility in that tabs 122 of varying height may be positioned in front of the product lanes 112 to accommodate various sized products. That is, if a row of product has a product height that is different than a product in an adjacent row, tabs 122 of varying height can be used to provide the proper level of security and access to the product.

In one embodiment, the tabs 122 may be sized to extend across one product lane 112 or in front of a single row of product. In an alternative embodiment, the tab 122 may be sized and shaped to extend across multiple product lanes 112. In this embodiment, the tabs 122 could include slots or channels to permit the tabs to "straddle" the dividers 110 and thereby extend across multiple product lanes. In addition, the dividers 110 could extend through the slots or channels and thereby inhibit slidable movement of the tabs 122.

The second retaining wall or tab 122 may also be used in place of the retaining wall 116. In other words, the front "fence" on a product facing may be the tabs 122 of varying height, length and width, or of the same dimensions. In this configuration, the channel or rail 118 may be used to mount dealer-shelf accessories, such as clip-in signage, price tag holders, and the like. The tab 122 also can be attached to the divider 110 or can be formed such that the tab 122 and divider 110 are an integral piece. A wall or partial wall structure such as tab 122 can exist at the front of the divider 110 and can extend to the left or right or to both the left and right of the divider. This wall or partial wall can be used with or without a front retaining wall 116.

In an exemplary embodiment, the tabs 122 may include holes or openings 125 through the tab 122, similar to the holes or openings 120 in the retaining wall 116, to permit the consumer and store personnel to push the product back and away from the retaining wall 116 and tab 122 for ease of insertion and removal of the product. In other words, the holes or openings 126 allow product to be replaced by a consumer who removes it and decides not to purchase the product. To this end, the holes or openings 120, 125 are constructed to allow finger access therethrough to push back the row of product. Once the products are pushed backward, the consumer or store personnel can replace the removed products back into the facing. It should be understood that tabs 122 also can be used that do not include the holes or openings 125.

In an exemplary embodiment, the tab 122 may provide securement for an individual row of a product facing. That is, it may be desirable to provide additional theft deterrence for an individual row of product. In this configuration, the tab 122 having the desired dimensions may be positioned in front of a desired product row to provide additional securement for just that row of product. This embodiment will provide the stores with additional flexibility with their planograms and product facings in that individual tabs 122 of different dimensions may be placed at various locations across the facing to enhance the securement of particular products.

In an embodiment, retainer tabs 122 can be used on an individual facing basis for specific products. If a shelf is merchandised with product packages of variable height, the retainer wall 116 must be of a height that allows the shortest product package to be lifted over it. If a shelf 104, barrier 130, or barrier 140 is employed above the product, then the shelf 104 or barriers 130, 140 must be located at a height above the product to allow the placement of the tallest product below it. This may allow a thief easy access to the taller product by being able to easily lift the taller product in quantity over the relatively short retainer wall 116. It can be desirable, then, to increase the height of a front barrier only in front of the taller product. The second retaining wall or tab 122 can be of a taller height than the retaining wall 116 and can be generally taller than required for the small product packages. The retainer wall or tab 122 can therefore be constructed and used to limit access to the taller product and removal of several taller products at a time or in one motion, further securing product and deterring theft. Similarly, the retainer wall or tab 122 can be constructed and used to limit access to smaller but deeper products and to limit the removal of several smaller but deeper products at a time or in one motion. The retainer tab 122 thus allows flexible placement of product on a shelf by the retailer and manufacturer, no matter the size, shape, and configuration of the product.

The retaining wall 116 and tab 122 may be mounted, directly or indirectly, to the shelf 104 using numerous techniques. The retaining wall 116 and tab 122 may be slidably mounted to or receivable in the channels or rails 118, 124, which are secured to the front edge of the shelf through fasteners, adhesives, friction, tension, magnetism, or other restraining techniques and methods. The retaining wall 116 and tab 122 may also be directly mounted or connected to the shelf 104 also through the use of fasteners, adhesives, friction, tension, magnetism, or other restraining techniques and methods. The retaining wall 116 and tab 122 may be fixed to the shelf 104 or removably mounted to the shelf 104 to permit additional flexibility in the design and level of security of the system.

Pushers 126 may be placed behind product between the back wall 106 and the front edge of the shelf 104 to push the product forward so that it may be removed from the front of the shelf. The retaining wall 116 and tabs 122, if used, in some embodiments can stop the forward movement of product that is caused by the urging of the pushers. Known pushers may be used with the invention, including the pushers and pusher systems described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, all of which are incorporated herein by reference. The pushers 126 may be spring-urged pushers that move along a track 128 to push product toward the front edge of the shelf 104, as shown in FIG. 6. Track 128 can form a floor on one side of the divider. A second floor, with or without a track, can be located on the other side of the divider.

In an embodiment, the pushers 126 may have a pusher face or paddle 129 that may extend laterally to increase the pushing surface of the pusher to thereby pusher wider product more effectively. In other words, the pusher 126 may have an extendable pusher face to push either narrow product or wide product. The pusher face or paddle 129 may be extendable from a retracted position to one of several extended positions. The extended pusher face locates the product pushing surface behind the center or near the center of the wider product, thereby greatly enhancing the pushing leverage on the wider product. Numerous other types of pushers and pusher faces may be used with the invention, including the systems and pushers described in U.S. patent application Ser. No. 10/772,134 to Hardy, which is incorporated herein by reference.

The pushers 126 may be stand-alone units that are mountable to the shelf 104 using any known technique, including the channel mounting technique depicted in the figures. That is, in one embodiment, the pusher 126 may be mounted to a front rail or channel 133, as shown in FIG. 6, and may be slidably adjustable within or on that rail or channel. Alternatively, the pushers 126 may be used in conjunction with dividers 110 and may be operatively mounted to the dividers 110, as disclosed in the above referenced patents and application, or as known in the art.

In another embodiment, the pushers 126 may incorporate spring mechanisms, such as coil springs, that include an indicia strip. The indicia strip is provided on spring mechanism and contains data relating to the position of the pusher 126. A sensor assembly may scan the indicia strip and transmit data representative of the product and the position of the pusher on the display system to a store computer or some other suitable device, such as a portable computer or controller. The transmitted data can be used to determine inventory levels and can be done so in real time. With this embodiment, the amount of product removed from a particular location in the store can be determined. This information can be used to determine the effectiveness of product placement and promotional displays, particularly when a product can be obtained from various places within the retail store. And with respect to deterring theft, a deviation in the typical purchasing habits of the consumer can trigger an alarm. That is, the alarm can be used to alert security personnel to the fact that too much product has been removed from the shelf at one time and thus a potential theft has occurred. The location of the incident can also be used to alert a security camera so as to focus the camera in the direction of the potential theft, as discussed below. With this embodiment, numerous types of sensors and detection techniques may be used to monitor the relative position and movement of the pusher 126. For example, in an embodiment, the indicia strip may contain numerous types of patterns that can be optically readable or can be read using several different types of detection methods, such as passive variable capacitance, inductance, resistance, magnetics, or active signal detection. Numerous other types of sensors and detection techniques are possible with the invention for detecting unusual movement of the pusher 126 that may be indicative of a potential theft situation, including the systems and techniques described in U.S. patent application Ser. No. 10/772,010 to Swafford et al., which is incorporated herein by reference.

In other exemplary embodiments, the merchandised product may be urged toward the front of the shelf 104 through other techniques, including friction, gravity and/or magnetism. Each of these techniques may be used with the display system 100 and the teachings of the present invention. These techniques may be used with or without dividers 110, depending on the desired application. In one embodiment, the shelf is not completely horizontal but has an incline or decline from back to front.

In another embodiment, the merchandised product may be urged toward the front of the shelf 104 through vibration or quick movements that orient products in a particular direction on the shelf 104. Vibration can cause products to move forward on the shelf 104 and prevent them from moving backward so that the product is front facing. This vibration may be applied through mechanical, electrical or other structures or designs.

In one embodiment, directed vibration moves product toward the front of the shelf. The directed vibration causes product to move in particular directions or in one direction and not to move in other directions. Through this vibration, which is instituted through the shelf 104, upright 102, floor, wall, ceiling or other structure, or through a vibrative pulse or signal traveling through the air, the product moves in a particular direction, such as frontward.

In another embodiment of the vibration technique for urging product forward on the shelf 104, general undirected vibration is applied to the system. This vibration may be applied through the shelf 104, upright 102, floor, wall, ceiling, other structure or through vibration or a signal traveling through the air. Directors, such as small toggles, ridges, flanges, fingers, or the like, cause product to move in a particular direction depending on their configuration, shape, and orientation. These directors can channel the energy from unspecific vibration and force product in a particular direction, such as frontward. The directors can be placed on the shelf 104, divider 110, floors, walls or ceilings of the system and can be incorporated into the product itself.

In an embodiment of the vibration technique, product sits on a floor and friction moves product toward the front of the shelf. In one embodiment, the floor may be a flat surface panel operatively coupled to a motion providing device. In use, product is placed on the flat surface panel and a combination of gravity and friction hold the product in place on the flat surface panel. The motion providing device then slowly moves the flat surface panel toward the retaining wall 116 located at the front of the shelf 104. After a preset amount of time, or through product position sensing techniques, the motion providing device quickly, in a jerking motion, pulls the flat surface panel in the opposite direction or, in other words, toward the back of the shelf. By doing so, the quick motion of the flat surface panel breaks the bond of friction between the product and the flat surface panel causing the flat surface panel to slide relative to the product and the product to remain at its location. The motion providing device will then repeat the previously described process and begin to slowly move the flat surface panel toward the retaining wall 116. Examples of such vibration techniques for urging product forward on a shelf are disclosed in U.S. patent application Ser. No. 60/541,859 to Hardy, which is incorporated herein by reference.

As indicated above, the dividers 110, retaining wall 116 and tabs 122 assist in preventing a thief from sweeping a number of products into his or her coat or bag or from taking several products in the same facing. To even further limit the access to the product, in another exemplary embodiment, a horizontal barrier 130 (FIG. 2) may be included above the product packages and secured to the front edge of the shelf 104 positioned above the product. The barrier 130 may be fixed to the front edge of the shelf 104 or may be fixed to uprights 102. The barrier 130 further deters unobstructed access to the product in the product facing by reducing the area, window or opening through which product could be removed from the shelf. The barrier 130 may be constructed separate from the shelf or may be integral with the shelf. The barrier 130 may span one row of product on a facing, or may span multiple rows of product, depending on the desired level of security. Alternatively, the barrier 130 may comprise another shelf 104 positioned just above the product. In this embodiment, the shelf 104 above the product is positioned in close proximity to the product. The barrier 130 restricts access from the front of the shelf 104 to only one or a few products positioned behind the front product in a facing row to permit the removal of only a few products from a shelf, or a product pusher, at one time or in one motion. The retaining walls 116 and tabs 122 may be used conjunctively with the barrier 130 to prevent product from being easily removed from the shelf 104. In other words, the present invention contemplates the use of one, two or multiple barriers or walls to prevent several products from being removed from the shelf at a time or in one motion. The barrier 130 may be made of various materials and may be secured to the front of the shelf 104 through any known technique.

Figure 13:
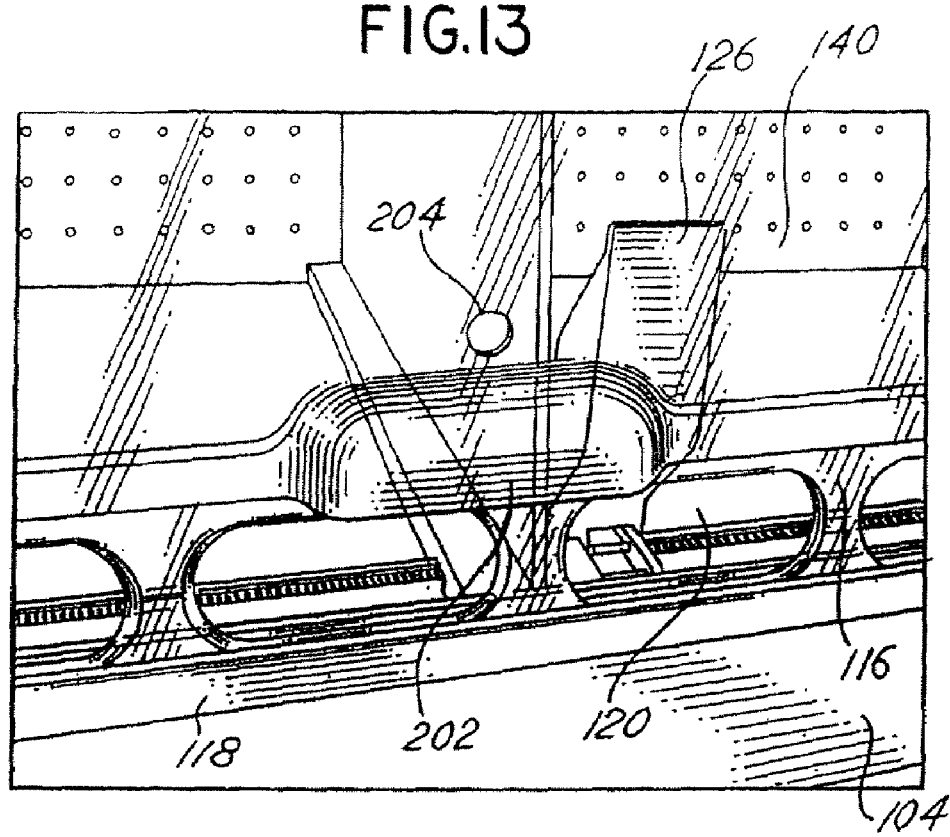
FIG. 13 depicts a close up view of an exemplary handle that may be used with the movable barrier or barrier extension of FIG. 11.

A further embodiment of the invention incorporates a barrier 140 that spans across one or two, some, all or the majority of the top of the product on a shelf 104. The barrier 140 functions similar to a door in that it may be hinged or movably mounted to the edge of the shelf 104, or the barrier 130, just above the product to be protected. As used herein, the term "barrier" is meant to include any structure that will prevent, inhibit or obstruct access to the product on the shelf 104. The barrier can embody numerous shapes and configurations. The barrier 140 may be mounted to the shelf 104 using existing mounting holes on the shelf. The barrier 140 also may be mounted on the front edge of a front rail from the shelf above it. The front edge of the shelf can have hooks or "j" shapes on its underside. The barrier 140 can have apertures which fit within the hooks or "j" shapes. The barrier 140 defines a bottom lip or edge that may meet or overlap the top edge of the retaining wall 116 or tab 122. Such meeting or overlap further closes off access to the product except with deliberate action. In an exemplary embodiment, as shown in FIG. 13, the barrier 140 may include a handle 202 to assist in moving the barrier 140 from a closed position to an open position, and vice versa. The handle may be molded with the barrier 140 along the edge of the barrier as exemplified by FIG. 13, or the handle may be a separate component attached, mounted, secured, or adhered to the barrier 140 using any known technique. One skilled in the art will appreciate that the invention is not limited by a particular shape or configuration of the handle and that the handle may define numerous shapes or configurations. Moreover, the barrier 140 may be configured with a reinforcing rim that extends along the edge of the barrier 140. The reinforcing rim provides additional structural integrity and rigidity to the barrier 140. The reinforcing rim may also be equipped or configured with a handle. If the barrier 140 is configured with a locking mechanism as described herein the reinforcing rim will assist in preventing a potential thief from bending or breaking the barrier 140 and thus giving the thief access to the product that is intended to be locked and secured on the shelf.

A hole or opening 204 may be located in the barrier 140 through which may be mounted a cable lock or similar locking mechanism, as discussed below.

In an alternative embodiment, the product display system includes inverted features. The aspects of the invention that are placed on a floor or a shelf and extend upward can be placed on a ceiling or extend downward, and vice versa. For example, the barrier 140 and retaining wall 116, the dividers 110, and tabs 122 may be inverted. It is contemplated that in some embodiments the retaining wall 116, the dividers 110, and/or tabs 122 may be configured above the barrier 140 which would extend upwardly from the shelf 104. The retaining wall 116, the dividers 110 and/or tabs 122 may be placed on the underside of the shelf above the product and extend downward. Pushers 126 and/or tracks 128 can be secured to the underside of a shelf such that the pushers extend downward and the pusher springs are located near or behind the portion of the pusher that is near the underside of the shelf.

In some embodiments, to access product behind the barrier 140, the barrier 140 must be moved or lifted, which requires a deliberate movement and the use of one hand to hold the barrier 140 in place. While the barrier 140 is lifted or moved, the product can be removed. A consumer or store personnel who uses one hand to hold the barrier 140 in place, will need to use the other hand to remove product from the display system 100. This embodiment is constructed to inhibit the ability of a consumer to access product with two hands at the same time. While product is accessible to the consumer or store personnel, the removal of large amounts of product in a short period of time is deterred. The barrier 140 can be created from a clear, opaque or semi-transparent material and may be hinged or slidable in a variety of common ways.

Figure 11:
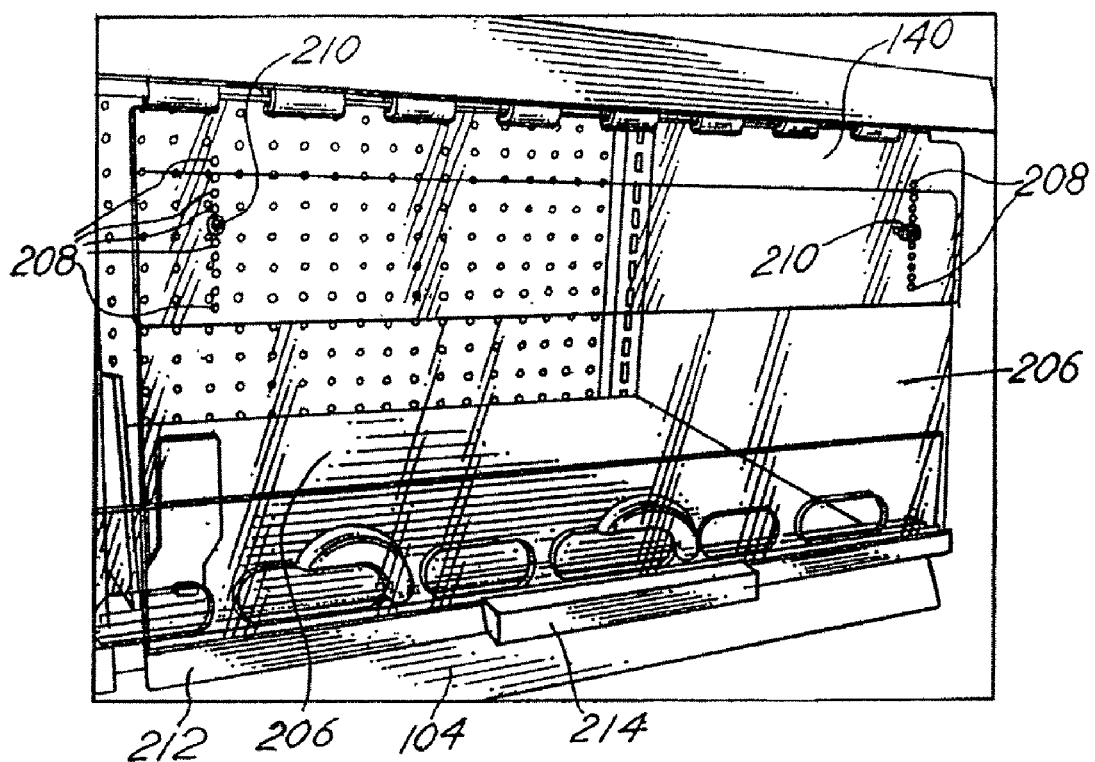
FIG. 11 depicts an exemplary embodiment of a movable barrier and barrier extension that may be used with the present invention.
Figure 12:
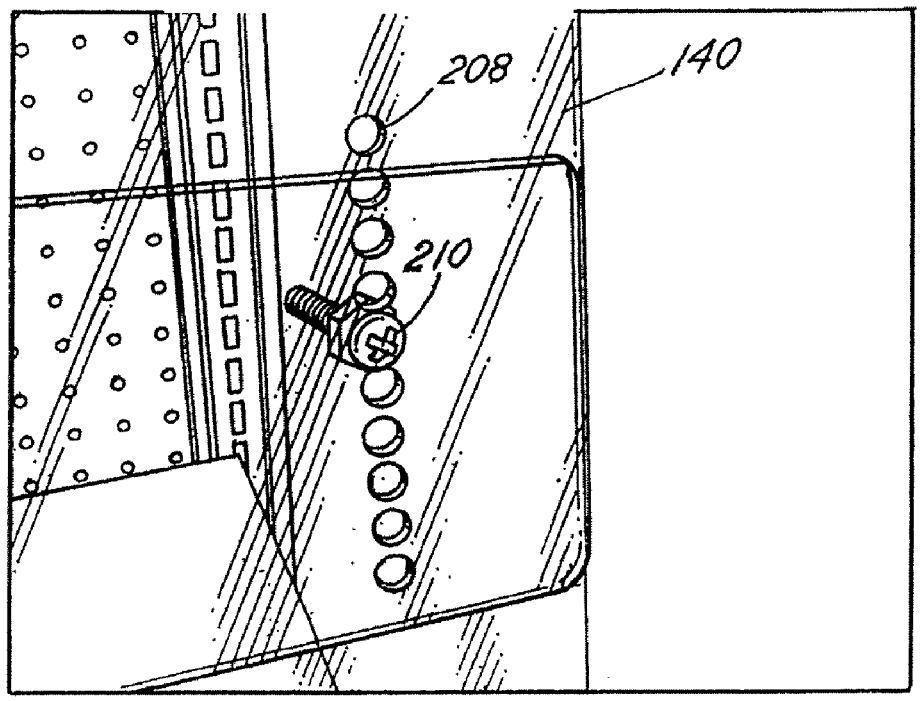
FIG. 12 depicts a close up view of the movable barrier and barrier extension of FIG. 11.

Referring to FIGS. 11 and 12, an adjustable and removable barrier extension 206 may be configured with the barrier 140. The barrier extension 206 may be used to provide additional product security by creating a larger barrier to prevent or limit access to the product on the shelf. The barrier extension 206 may be selectively mounted to the barrier 140 through the use of mounting holes 208 and fasteners 210. As shown in the figures, several mounting holes 208 can be located on either the barrier 140 or the barrier extension 206 or both. These mounting holes can be aligned vertically or non-vertically. The several mounting holes 208 permit the barrier extension 206 to be adjusted relative to the barrier 140 to permit the barrier extension 206 to extend a desired distance, depending on the application, the desired level of security, or the placement of the shelves. Other techniques for mounting or attaching the barrier extension 206 to the barrier 140 are possible with the invention, including techniques using other types of fasteners or adhesives.

The barrier extension 206 can define numerous shapes and configurations depending on the desired application and level of product securement. For example, the barrier extension 206 can be configured to extend across one row of product, one facing, or more than one row or facing. The barrier extension 206 may also be made of a clear, transparent, or semi-transparent material to permit or prevent the product on the shelf to be visible to a consumer or stock person. The barrier extension 206 may also include a handle similar to the handle 202 described above.

The barrier extension 206 may include a reinforcing rim 212 that provides additional structural integrity and rigidity to the barrier extension 206 to further provide additional product security. The reinforcing rim 212 may also be equipped or configured with a handle 214. If the barrier extension 206 is configured with a locking mechanism as described herein, or configured to be in a locked position, the reinforcing rim 212 will assist in preventing a potential thief from bending or breaking the barrier extension 206 and thus giving the thief access to the product that is intended to be locked and secured on the shelf.

Figure 10:
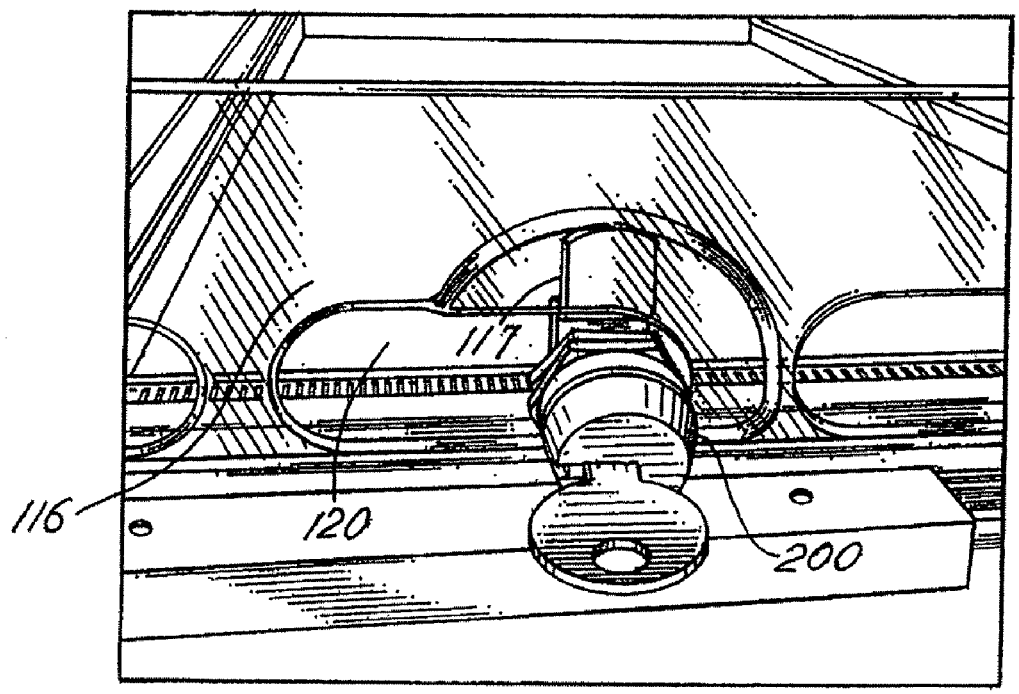
FIG. 10 depicts an exemplary lock mechanism that may be used with the present invention.
Figure 14:
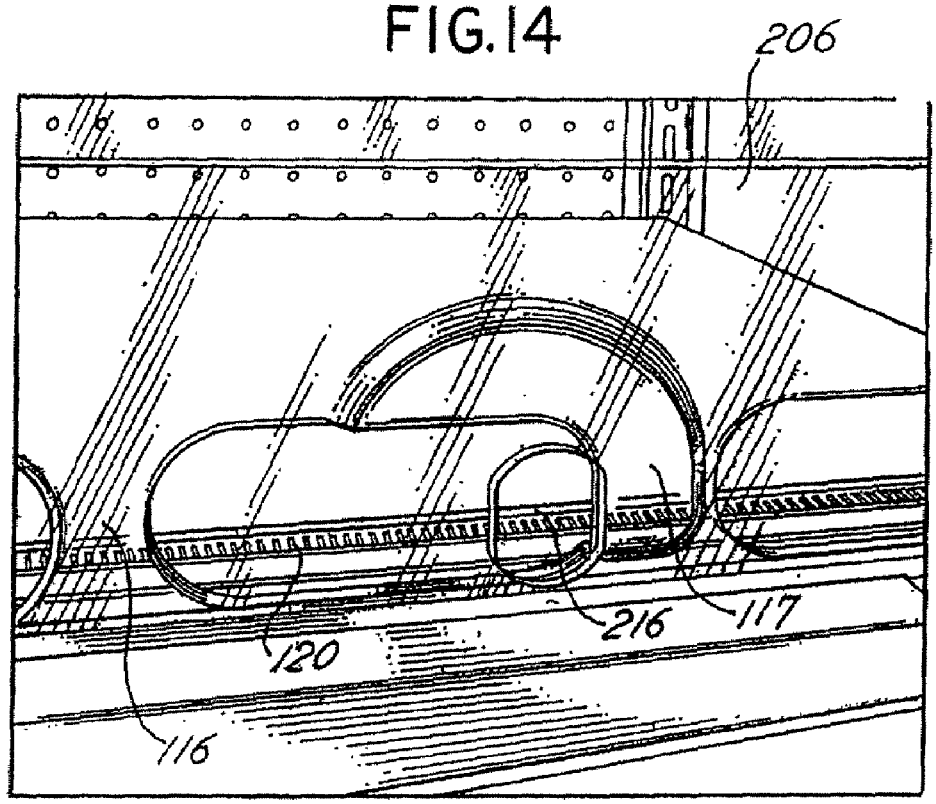
FIG. 14 depicts a close up view of the movable barrier and barrier extension of FIG. 11 defining an opening and mounting structure for receiving the lock mechanism of FIG. 10.

A locking mechanism may be further added to the barrier 140 to further hinder or prevent access to the product on the shelf. In an exemplary embodiment, as shown in FIG. 10, a cylinder lock 200 may be used to secure and lock the barrier 140 or barrier extension 206 in a closed position to prevent access to the product. The lock 200 may be mounted to the barrier 140 or barrier extension 206, through a opening or hole 216 (FIG. 14), and may be configured to mount through the openings 120 in the retaining wall 116.

In one embodiment, the lock 200 may engage an arcuate-shaped wall portion 117 configured in or formed with the retaining wall 116. The arcuate-shaped wall portion 117 will further secure the lock 200 to the retaining wall 116 by permitting the locking tab of the cylindrical lock 200 to more securely seat on, or be held in place relative to, the retaining wall 116. With the use of a lock, such as lock 200, a consumer or store personnel will need to use a key, special tool, or access card to open the lock prior to moving or lifting the barrier 140.

In one embodiment, the lock 200 may engage an arcuate-shaped wall portion 117 configured in or formed with the retaining wall 116. The arcuate-shaped wall portion 117 will further secure the lock 200 to the retaining wall 116 by permitting the locking tab of the cylindrical lock 200 to more securely seat on, or be held in place relative to, the retaining wall 116. With the use of a lock, such as lock 200, a consumer or store personnel will need to use a key, special tool, or access card to open the lock prior to moving or lifting the barrier 140.

Figure 18:
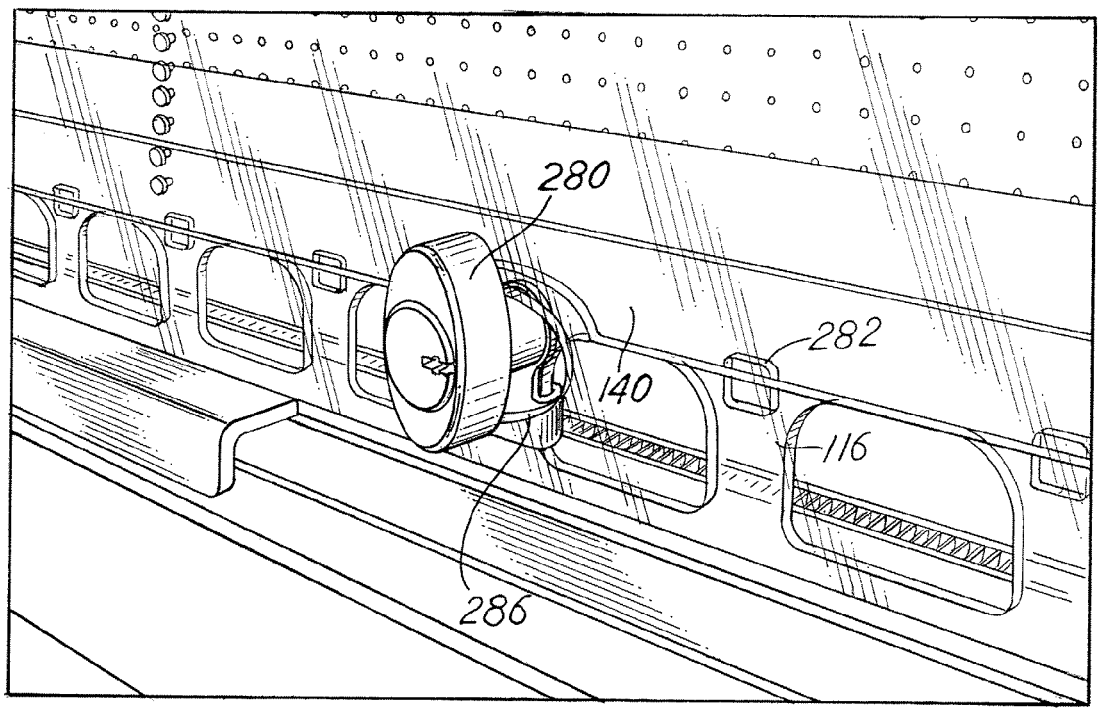
FIG. 18 depicts another exemplary lock mechanism that may be used with the present invention.
Figure 19:
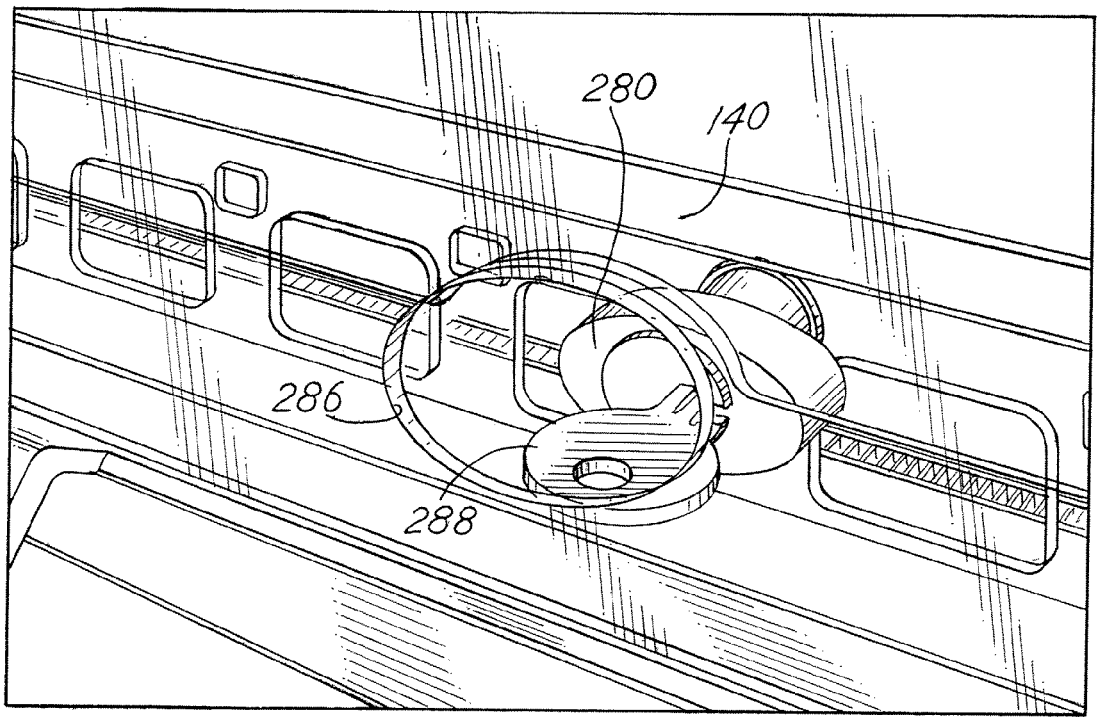
FIG. 19 depicts another view of the exemplary lock mechanism of FIG. 18.
Figure 20:
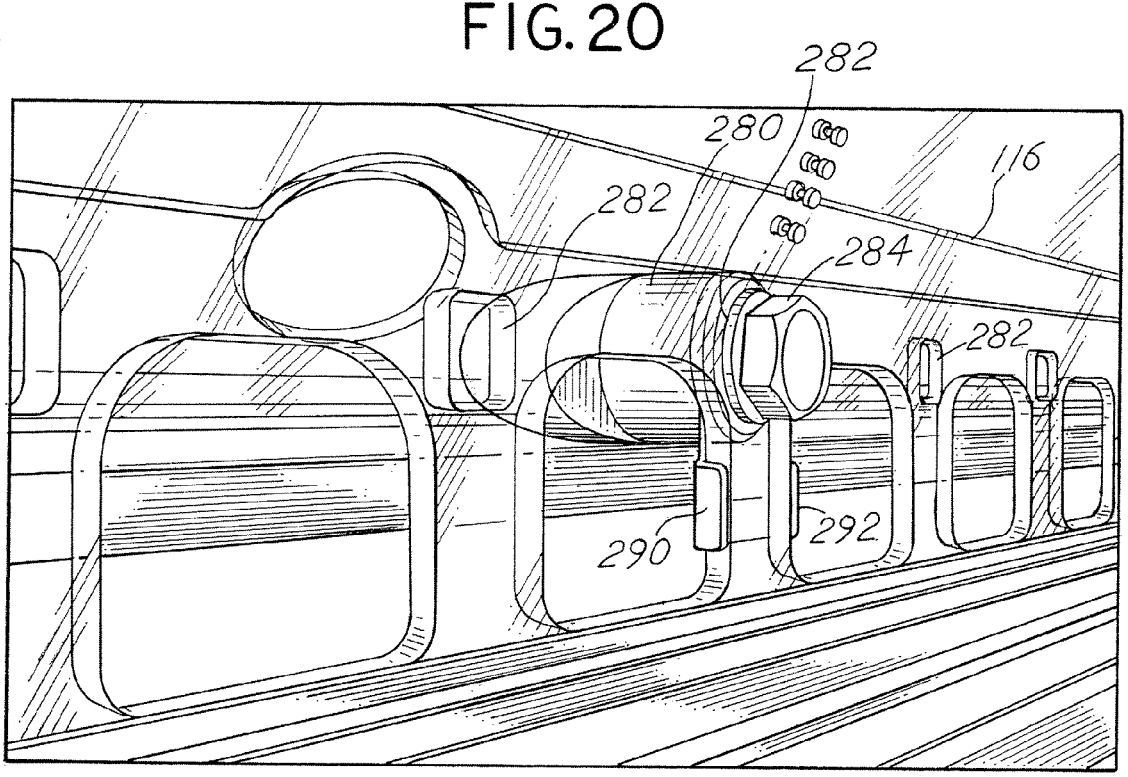
FIG. 20 depicts a back view of the exemplary lock mechanism of FIG. 18.

Referring to FIGS. 18-20, another exemplary lock mechanism is depicted. A lock 280 may be a key-locked rotating oval-shaped lock. The lock 280 is secured to the retaining wall 116 through a hole 282 formed in the retaining wall 116. More specifically, and referring to FIG. 20, the lock 280 includes an anchoring bolt that defines a bolt head 284. The bolt head 284 and washer, if used, will secure the lock 280 to the retaining wall 116. As can be seen in FIG. 20, numerous holes 282 may be positioned along the retaining wall 116 to provide flexibility in the location and placement of the lock 280, as well as providing for the use of numerous locks 280. The lock 280 also can include flanges 290, 292 that interact with retaining wall 116.

Referring to FIGS. 18 and 19, the barrier 140, or barrier extension 206 if used, defines an oval-shaped opening 286. Similar to the flexibility provided by the numerous holes 282, numerous openings 286 may be placed along the barrier 140 or barrier extension 206 to provide the same flexibility. As shown in FIG. 18, when the lock 280 is in a locked position, the opening 286 prevents the lock 280 from passing through the opening 286. As illustrated by FIG. 19, when the lock 280 is moved to an unlocked position through the use of a key 288, the oval-shaped lock 280 will to pass through the oval-shaped opening 286 thus permitting the opening of the barrier 140 or barrier extension 206. With the use of the lock 280 and its mounting to the retaining wall 116, as opposed to a lock mounted on the barrier 140 or barrier extension 206 and extending into the shelf, there will be no interference with product on the shelf, as may sometimes occur with the barrier-mounted locks. In addition, the lock 280 can, but need not, interact with the channels or rails 118, 124 and can leave these channels or rails substantially free to receive other objects such as a retaining wall or tab 122. As can be appreciated, the invention is not limited to the depicted oval-shape lock 280 and opening 286 as well as the illustrated placement of the lock and opening; rather, many various shaped keyed or keyless locks may be used with similarly shaped openings formed in the barrier or barrier extension and placed in numerous locations and still achieve the benefits of the invention.

Alternatively, FIGS. 21-24 depict an additional locking mechanism. A lock plate 302 can extend through an opening or slot 304 formed in the retaining wall 116 and through an opening 306 formed in the barrier 140 or barrier extension 206. The lock plate 302 is configured to receive the padlock 300. One or more of the openings or slots 304 may be formed in the retaining wall 116 at various positions along the retaining wall including the depicted positions between the holes or openings 120 in the retaining wall 116. The openings or slots 304 are configured to receive the lock plate 302 and to secure the lock plate 302 onto the retaining wall 116, as described below. While the openings or slots 304 are depicted as vertical slots, other shapes and configurations of the openings or slots 304 are possible with the invention. Padlock 300 may be used to secure and lock the barrier 140 or barrier extension 206 in a closed position to prevent access to the product. The padlock 300 may be any known keyed or keyless padlock and may be mounted to the barrier 140 or barrier extension 206 through the use of a movable lock plate 302.

As can be appreciated, depending on the desired level of security, one or more lock plates 302 may be used to secure and lock the barrier 140 or barrier extension 206 in a closed position to prevent access to the product. The lock plates 302 are movable in that they can be positioned within any of the openings or slots 304 along the retaining wall 116. Being movable also permits the barrier 140 or barrier extension 206 to be made in various widths to protect only those products on the shelf that must be protected. In addition, the lock plate 302 need not interact with the channels or rails 118, 124 and can leave these channels or rails substantially free to receive other objects such as a retaining wall or tab 122.

Figure 21:
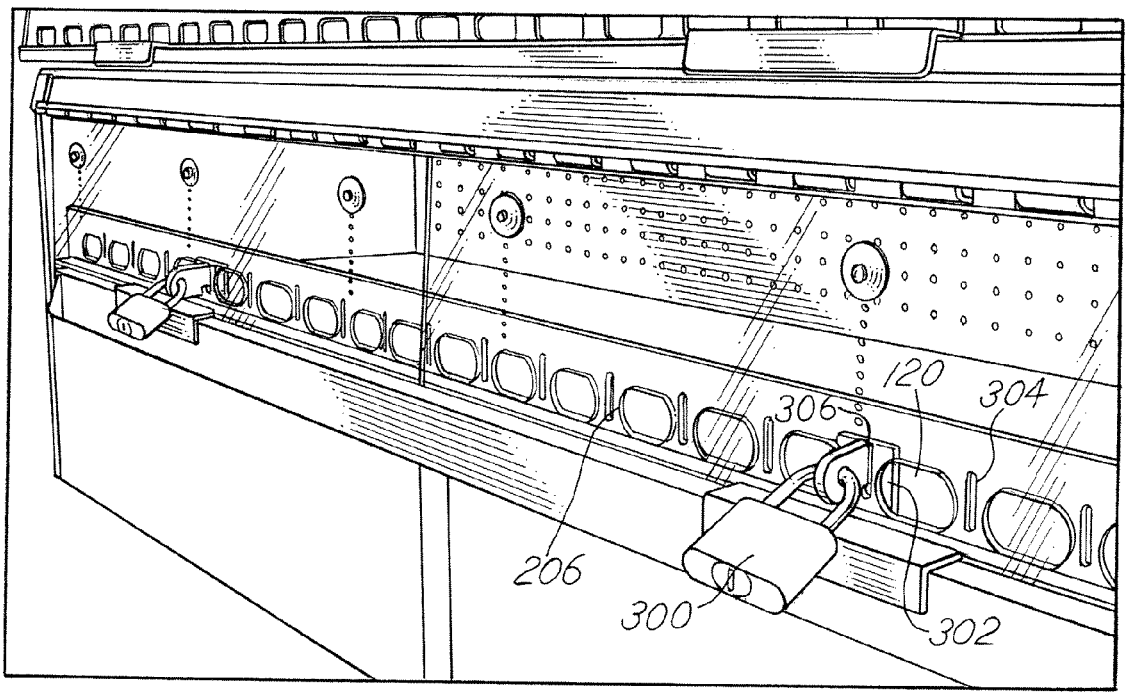
FIG. 21 depicts yet another exemplary lock mechanism that may be used with the present invention.
Figure 22:
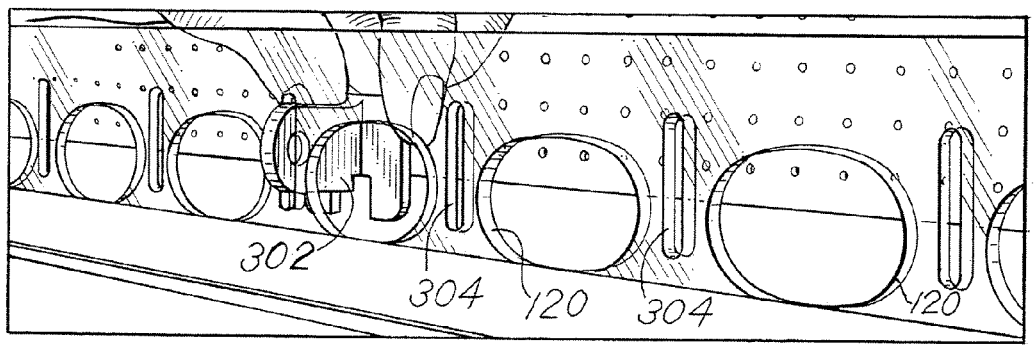
FIG. 22 depicts another view of the exemplary lock mechanism of FIG. 21.
Figure 23:
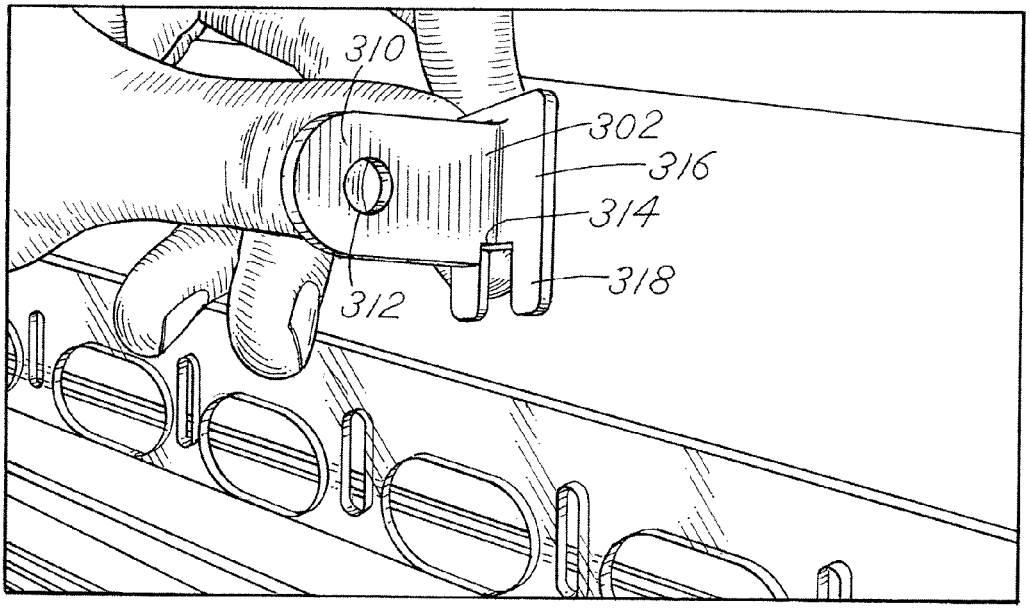
FIG. 23 depicts a close-up view of the lock plate of the exemplary lock mechanism of FIG. 21.
Figure 24:
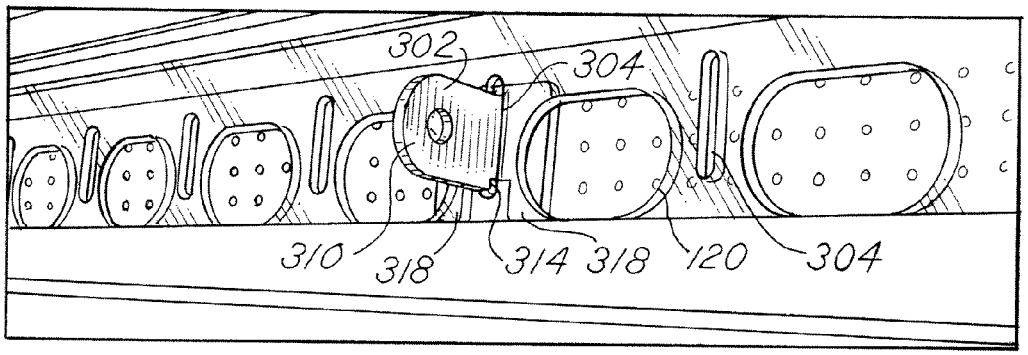
FIG. 24 depicts another view of the lock plate of FIG. 23.

In an exemplary embodiment, the lock plate 302 may be made of any suitable metal or plastic material and may define a nose 310 that will extend through the retaining wall 116 and barrier 140 or barrier extension 206, if used. The nose 310 further defines an opening or hole 312 for receiving the padlock 300, as illustrated by FIG. 21. The nose 310 also defines a notch or cut-away 314 that, when assembled, will seat on the bottom edge of the opening or slot 304, as shown in FIG. 24. Once in this position, the notch or cut-away 314 will prevent the lock plate 302 from being slid or pushed back out of the slot 304 and behind the retaining wall 116.

The nose 310 is connected to or formed with a back plate 316. The back plate 316 includes legs or retaining members 318 that, when assembled, will be positioned behind the retaining wall 116 and assist in holding the lock plate 302 on the retaining wall 116. The back plate 316 and retaining members 318 may take on numerous configurations that aid in holding the lock plate 302 to the retaining wall 116. The lock plate 302 may be configured to not only extend through the retaining wall 116 and barrier 140 or barrier extension 206, it may also extend through and be used with the tab 122.

One skilled in the art will appreciate that any known locking mechanism can be used with the invention, including a cable lock that may be mounted with the hole 204 (FIG. 13), and any known key, special tool, access card, electronic, magnetic or wireless means (for keyless locking mechanisms) can be used to open the locking mechanism.

Figure 8:
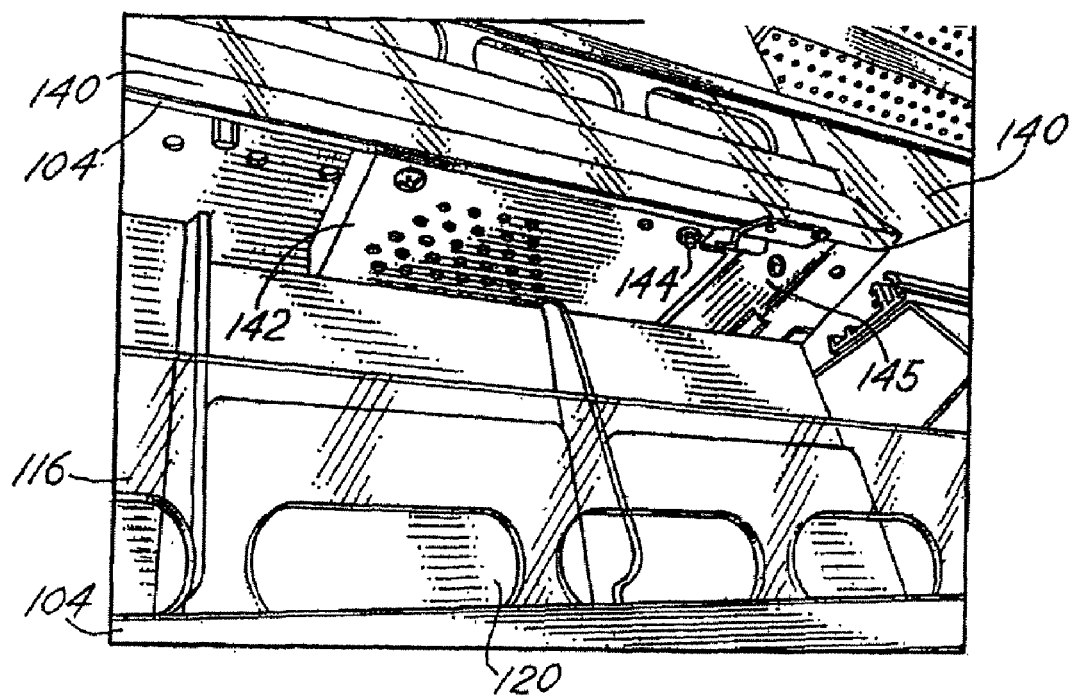
FIG. 8 depicts a front elevation view of an exemplary embodiment of a front retaining wall and a secondary retaining wall with product displayed on the shelf.

As depicted in FIG. 8, an exemplary embodiment of the invention incorporates a system that causes an alert to store or security personnel that a potential theft situation exists. In one embodiment, lifting or moving the barrier 140 activates a mechanical or electronic alert device 142, generally depicted in the figures, that provides a signal, such as an audible, inaudible, infrared, radio-frequency, cellular, ultrasonic or electronic signal (including digital and analog signals), or a combination of these signals. This alert signal may be a sound, tone or voice annunciation that alerts store or security personnel that the barrier 140 has been opened or has been opened for an unusually long period of time and potentially represents a theft situation. The alert device 142 also may send an electronic or other signal to play a voice message via the store paging system, to activate a local or remote strobe or annunciator light, or to send a signal to a receiver, such as a store computer, a pager, cellular device, or other portable device carried by store or security personnel. The alert device 142 may also activate a security video camera to monitor the particular area or vicinity, or activate a monitor that is placed in the area or vicinity which would show the camera image to the consumers and potential thief, or transmit the camera image to security or store management via a web connection, cellular telephone, personal data assistant, or any other signal receiving device. The alert device 142 also may activate an advertisement, informational announcement or other statement or display that is provided through voice, video or video and voice. This advertisement, announcement or statement can be directed to the particular product or product type associated with product behind the barrier that activates the alert device. The alert device can be located such that barriers of a width of no more than one product facing will activate the alert device when lifted.

As used herein, the term "alert device" is meant to include any device or component that may provide an alert, warning and/or signal concerning a condition, situation, and/or circumstance. The alert device 142 may be hard-wired to the store's security system or may be a wireless system. Wireless systems, if used, provide increased flexibility in installation and can be readily installed in existing shelves without the need to install wires for either power or communication. In addition, the use of a wireless system allows for the gradual installation of a system. For example, items of high value (and therefore suffering from an increased likelihood of being stolen) or items that tend to have significant variations in customer demand can be monitored first. With a wireless system, the alert signal may be sent to not only the store's security system or computer, but also any portable device or receiver, such as a controller, personal data assistant, pager or cellular telephone that may be carried by store personnel or security. Also with the wireless or wired system, the store's computer can process further the alert signal to determine whether a theft situation exists and can generate reports which can be analyzed to fine tune product placement, placement of cameras, alert devices, sensors, and so forth, as well as fine tune the delays and actions initiated by potential theft situations. As understood by those skilled in the art the store's computer can be configured with the network server and can be accessible remotely through the world-wide web or other network, and can be controlled remotely through the world-wide web or other network.

In an exemplary embodiment, the alert device 142 is positioned on the shelf 104, either underneath, as depicted in FIG. 8, or on top of the shelf. Existing mounting holes on the standard dealer shelf may be used to secure the alert device to the shelf. The alert device 142 may be positioned near to or adjacent to the barrier 140. The alert device 142 may be operatively connected to the barrier 140 through numerous techniques. In one embodiment, the alert device 142 includes a switch 144, such as a push-button switch, that will activate when the barrier 140 is moved or opened. That is, as the barrier 140 moves and comes in contact with the switch 144, either directly or through the use of an activator plate 145, the switch 144 is activated. Alternatively, in a closed-barrier position, the switch 144 is pressed, as the barrier 140 moves to an open position the barrier 140 moves away from the switch 144, thereby releasing the switch 144 and thus activating the alert device 142.

The alert device 142 may be operatively connected or coupled to the barrier to detect movement of the barrier through other methods or techniques. For instance, a motion sensor or similar sensory devices, such as a light-emitting diode sensor assembly, may be used to detect movement of the barrier and communicate that information to the alert device 142. The sensor may be mounted in a variety of locations including on the barrier itself or next to the barrier to detect barrier movement. Alternatively, a magnetic switch may be incorporated to detect movement of the barrier.

The alert device 142 may include sensory components and time-delay features that will calculate how long the barrier 140 has been moved or opened. Upon reaching a predetermined time period, in other words, as the barrier 140 has been moved or opened for a certain duration, the alert device 142 will send a signal, such as the above-mentioned signals, to alert the store personnel, security and/or the consumer that the barrier 140 has been opened or moved for a long period of time, thereby indicating a potential theft situation. In an exemplary embodiment, upon the passing of the predetermined time period, the alert device 142 may send an audio alert signal, including a signal different from a previous audio alert signal, that would draw attention to the vicinity. The alert device 142 can therefore be designed to provide its alert for a fixed period of time before becoming silent.

In another embodiment of the alert device 142, the audio alert signal is adjustable to provide a variety of alert tones of varying frequencies, or to announce that the barrier 140 has been opened or moved for too long and that the consumer needs to close the barrier 140, or to send a silent alarm to the store and/or security personnel. Different signals or frequencies can be used as the length of time in which the barrier has been opened or moved increases. Numerous combinations of alert signals are possible with the alert device 142 depending on the desired level of security. The alert signal is adjustable and numerous combinations of signals may be used to provide the desired signal level and thus security level, yet avoid turning away legitimate consumers from selecting and purchasing the product. That is, for example, the alert device 142 can be programmed to provide an alert signal that will draw the attention of surrounding shoppers or store/security personnel, yet short enough to limit aggravation of the legitimate consumers or stock person.

Also, in another embodiment, a two-tiered response could be implemented. For example, if the barrier 140 is moved, a signal could be transmitted directly to the security camera, or via the store computer or both. In addition, an inaudible notification could be provided directly to security personnel. If the barrier 140 remains open or moved for a set period of time, more clearly indicating a potential theft, an additional audible alarm and flashing lights could also be activated, or any other alarm. Thus, the response could be configured to more carefully match the situation.

Figure 15:
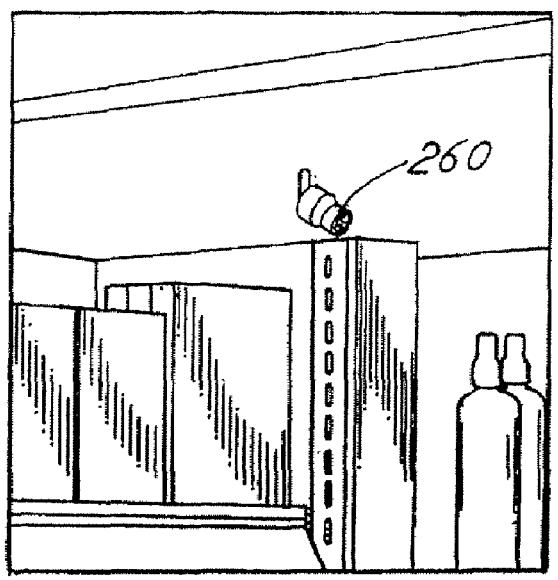
FIG. 15 depicts a partial front elevation view of the exemplary securement and management system of FIG. 1 including the use of a security camera.
Figure 16:
FIG. 16 depicts a partial front elevation view of the exemplary securement and management system of FIG. 1 including the use of a video monitor.

Referring to FIG. 15, in an exemplary embodiment, a security video camera 260 may be placed in the vicinity of product that are high risk theft items, or other product of concern. As shown in FIG. 16, a monitor 262 also may be placed in the vicinity of the high risk product. The monitor 262 may be used to show the security camera image to consumers and any potential thief. Thus, a consumer or potential thief that removes product from the shelf 104 of the display system 100 may realize that their actions are being watched by a camera and potentially recorded.

As can be appreciated, the position of the potential theft relative to the security camera 260 would be beneficial to provide an instruction to the security camera to focus on a particular position. This positional information could be generated by a number of methods, including providing a store computer with the security camera coordinate system for the security camera. The location of the alert device 142 relative to the security camera could be determined during setup and during a potential theft situation; the location of the alert device 142 could be used to direct the focus of the security camera. Alternatively, the security camera could be configured to focus in several positions, such as three points along an aisle, and the store computer could indicate which position was the most appropriate for the particular situation. One skilled in the art will appreciate that the described methods are illustrative because of the numerous methods of controlling the security camera that exist.

Figure 17:
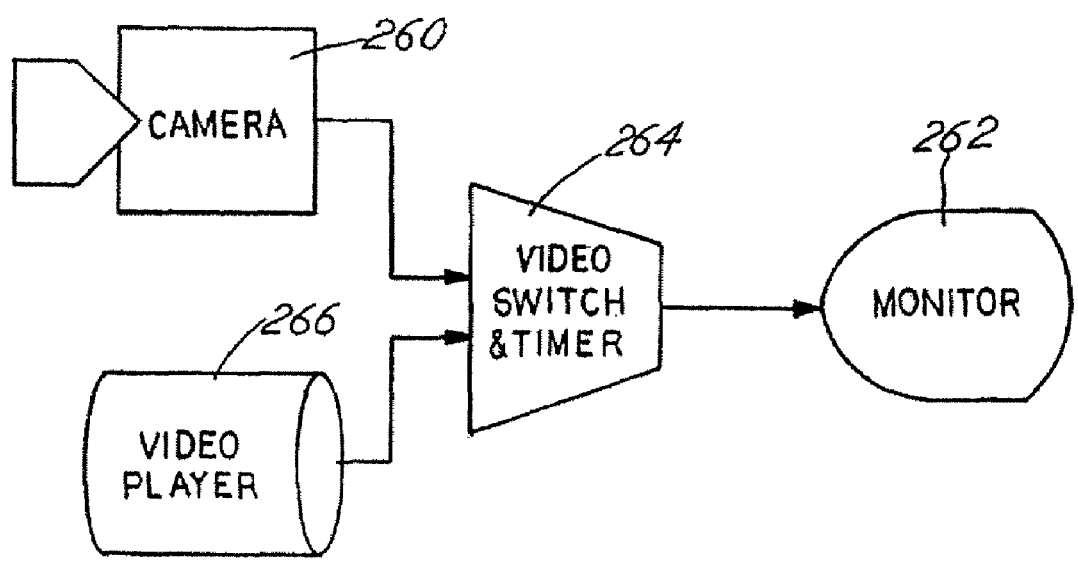
FIG. 17 depicts a diagram of an exemplary switching operation between a camera image and an image from a video player on the monitor of FIG. 16.

In addition to the value of such system in loss prevention, the monitor can show video in the form of advertising or consumer information. As illustrated by FIG. 17, the monitor 262 can switch between the advertising or consumer information and the camera image through the use of a video switch 264. This switching activity can occur on a periodic basis, such as every 30 seconds, or can occur when predetermined conditions are met, such as the lifting of the barrier 140, the removal of product, the movement of a pusher, or input from a proximity sensor that a consumer has entered or approaches the area. By playing the video segment, the device not only reduces loss, but becomes a source of revenue when advertisers are charged to place their message on the system.

A secondary video source for the monitor on which advertising, consumer information or other content is shown can be a video player 266 such as a video cassette recorder, compact disk-video player, solid state digital video player, direct video, audio feed or other video sources. With respect to the switch 264, the switching action between the camera image and advertising or other content can be effected by a hardware timer or a small microcontroller. In one embodiment, the secondary video source can contain a multitude of short video segments which are randomly or non-randomly selected by the timer or microcontroller. The camera 260 may be a small, stand-alone type, not connected to any part of an existing security system, or it may be any typical store security camera existing in the store's security network. The monitor 262 may be a small flat, color, LCD type monitor and can be placed at numerous locations on or near the shelf 104. For instance, the monitor may be placed in overhead signage above the merchandised product or it can be attached to the shelf 104 edge. In some applications, a larger monitor, such as a CRT-type, plasma, LCD or projection monitor, can be used. A preferred solid-state digital video player may comprise the secondary video source. The source may be housed in the same enclosure as the monitor or may be located remotely from the monitor.

Referring back to FIGS. 4 and 5, in another exemplary embodiment, the shelf 104 on which the product rests may be a "pull-out" shelf. The "pull-out" shelf allows store associates or personnel access to the product to restock the shelf but prevents a thief from obtaining such access. The pull-out shelf allows easy access to all product on the shelf. This function, however, requires that the shelf not be movable by the consumer or thief and therefore the pull-out function must be protected by a key-lock, special tool, or other locking mechanism. In this embodiment, the product dividers 110 may be designed to be at least equal to the height of the tallest product package on the shelf. As the shelf 104 is pulled out, the product lane or dividers may cause the barrier 140 to rise. If the height of the dividers 110 is lower than the tallest product package, pushing the shelf back in may cause the barrier 140 to catch on the product packages and make it more difficult to return to its closed position. Additionally, pulling out the shelf 104 will raise the barrier 140 which may activate an annunciator or signal generator, as explained above.

Figure 9:
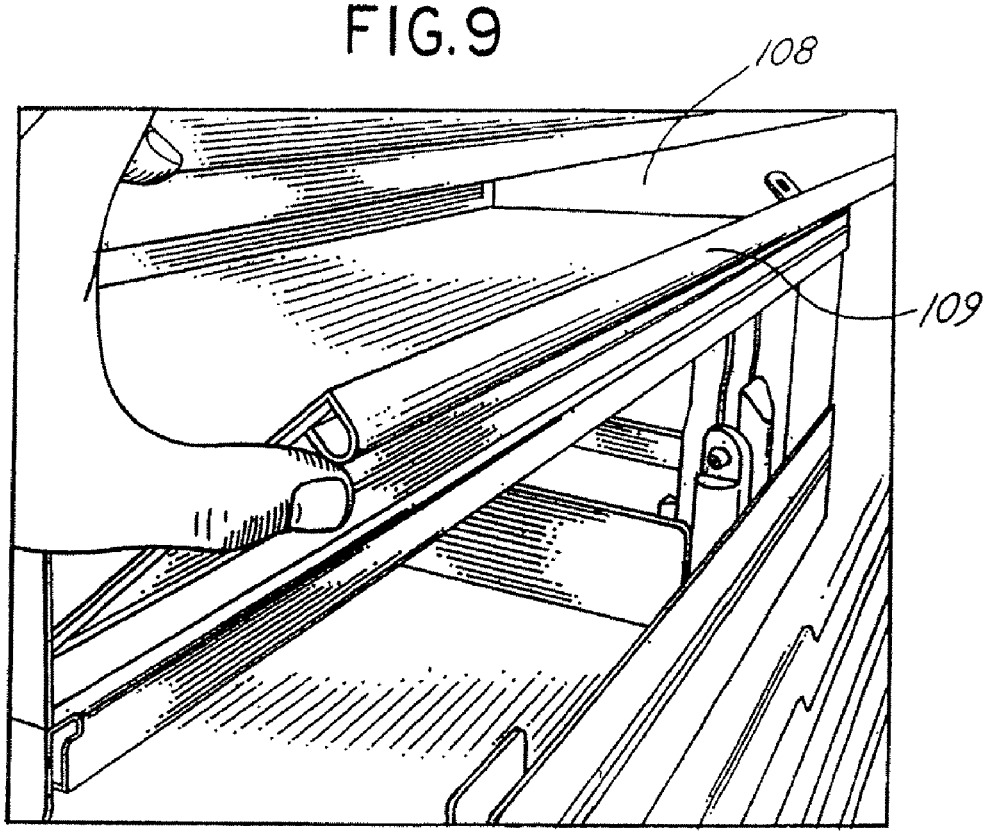
FIG. 9 depicts a bottom view of an exemplary alert device mounted to the exemplary securement and management system of FIG. 1.

Referring to FIG. 9, in an exemplary embodiment, a barrier placed on a top-most shelf 104 may include a lock-box 108 that may be used for storage of overstock product or additional display system 100 components. In an embodiment in which the top-most shelf 104 is a pull-out type, the shelf 104 will pull out while the horizontal barrier above it remains in place, allowing product to be easily accessed. As indicated above, the lock-box 108 may also be mounted to the vertical uprights 102, through known mounting techniques, and may be mounted at any location on the display system 100. The lock-box 108 may use any known locking mechanism that permits key or key-less entry to the lock-box 108. One skilled in the art will appreciate that other security components may be mounted to the lock-box 108 including the security camera, monitor, and alert device 142, to name a few.

In an embodiment, a stationary shroud 180 may placed toward the top of the product display system 100. The shroud 180 provides security and graphic placement, and product may be stored within it. The shroud 180 provides security in that it functions as a top wall or barrier preventing access to the product from a point above the product. The shroud 180 may mount on or to an existing shelf. The shroud 180 may be fixed or adjustable. With an adjustable shroud, the shroud can be positioned at numerous locations on the product display system. In addition, the shroud 180 can be a pull-out shroud functioning in manner similar to the exemplary pull-out shelf 104 described above. Moreover, the shroud 180 can also serve as a shelf to hold product. In other words, the product display system 100 could include multiple shrouds 180 that function as shelves to hold or display product. Also, the shroud can be configured to mount the barriers 130, 140, through numerous known mounting techniques. In an exemplary embodiment, the lock box 108 having a lockable door 109, as shown in FIG. 9, may be placed on the shroud 180 for additional product storage and graphic placement.

The product display system 100 of the invention offers various levels of securement and theft protection. Each level described herein can be used separately and various or all levels can be used in conjunction with each other. Each level can also be added to or adapted with existing shelf systems or be provided as a stand alone system. The divider or retaining walls 110 provide securement. The front retaining wall 116 or "fence" provides securement, with or without the retaining tabs 120. The barriers and access doors 130, 140 over the top of the retaining wall 116 provides securement. The close positioning of the shelf 104 over the product located on the shelf below provides securement. The audible or other signal that is generated by the alert device 142 when the barrier 140 has been open for a set period of time provides securement. The security camera and video and display devices provide securement. Each of these separable aspects of an embodiment of the invention can be used on its own in a retail setting, or can be used in conjunction with other aspects of the embodiment. Each separable aspect can be added to existing shelving or display systems to effectively retrofit and add one or more levels of security to such existing systems.

One embodiment of the invention features various levels of theft deterrent. One level assists in preventing sweeping of products. Pushers 126, dividers 110, and retaining walls 116 are coupled with a shelf 104 or barrier 130, or both, above the product to provide securement to the product. The pushers, dividers, retaining walls, shelf, and barrier allow approximately one, two or three packages to be removed through an opening at one time from a facing of the display system. Second retaining walls or tabs 122 may be used to provide individual securement for specific rows of product. The front wall 116 and tabs 122 may also include holes or openings that extend therethrough that would require the consumer to push on the product through the holes or openings in order to remove the product from the shelf.

A second level of securement incorporates all of the features of first level with the addition of a barrier 140 or access door. To access the product, the consumer must utilize two hands, one to lift or slide the barrier 140 and the other to remove the product, thus adding a second layer of deterrent to the system.

A third level of securement builds upon the features of the first and second levels with the addition of a theft-warning notification device, such as an alert device 142, or other signal transmission device. The alert notification or signal transmission is activated if the barrier 140 or access door is open a predetermined amount of time. This delay can be adjusted to any duration or eliminated. The notification provides an audible, inaudible, infrared, radio-frequency, electronic, or cellular signal that notifies consumers and/or store and security personnel that the barrier 140 has been open for a particular period of time. The signal transmission can send a signal to a store computer, store personnel or a security camera or monitor. The signal can alert the store computer or personnel that the barrier 140 or access door has been opened for a particular period of time and can activate the security camera and monitor to show the thief an image of himself or herself in front of the product. This image can be recorded. Additional alert notifications or signal transmissions can be activated as the amount of time the barrier or access door is open increases.

An additional level of deterrence of theft by consumers or store personnel is the use of a locking mechanism on the shelf 104 to limit unauthorized personnel from pulling out the shelf. The system can require the use of a key or an uncommonly or commonly shaped instrument to be inserted into a concealed access slot in the front or underside of the shelf. This method is designed to require someone with specific knowledge of the shelf operation to disengage the lock. In an embodiment, the barrier 140 or access door on the shelf 104 can be automatically raised for restocking purposes when the shelf is pulled out, then re-engaged once the shelf has been returned to the closed position. In this application, an audio alert may be incorporated that indicates that the shelf is being restocked with product.

In addition, in an embodiment, a stationary shroud 180 may be placed toward the top of the product display and management system. The shroud provides security by inhibiting access to the product from above the product. Also, a lock box can be placed anywhere on the system to store additional product that will be secured by a key lock or some other locking mechanism.

In one embodiment of the present invention, various aspects of the invention are added to portions of existing shelves. In some environments, there are only one, two or a few potential high-theft products among a display of many products. Aspects of the present invention can be added solely to the portion of a shelf management and display system with respect to those high-theft products. For example, a barrier 140 could be placed solely over those products. In addition, side walls could be placed to cover one or more of the sides of the products to further deter sweeping or other theft. A front barrier, a locking mechanism or other aspects of the invention described herein could be used solely with the high-theft products or other highly relevant products in a display and not used with other products in the same display. In one embodiment, a particular set of relevant products can be effectively segregated from the other products within the same display. This particular set of relevant products can be subject to additional security aspects described herein that are not used with the remaining products in the display.

Figure 28:
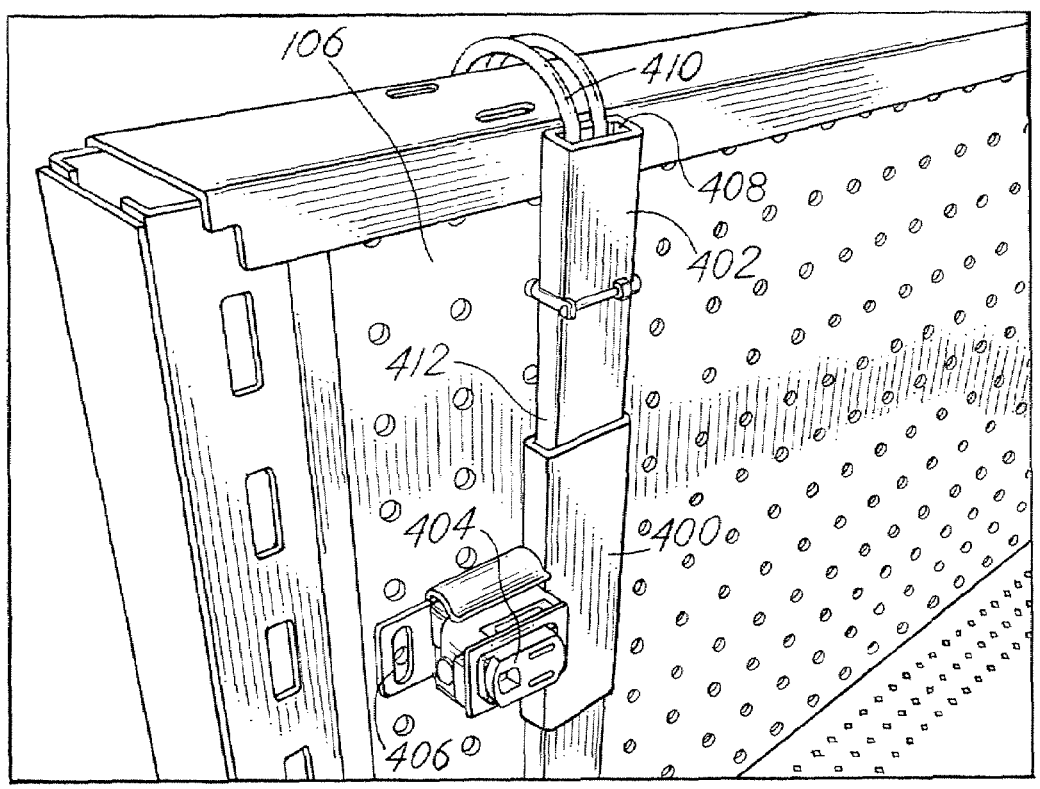
FIG. 28 depicts an exemplary electrical power bar that may be used with the invention.
Figure 29:
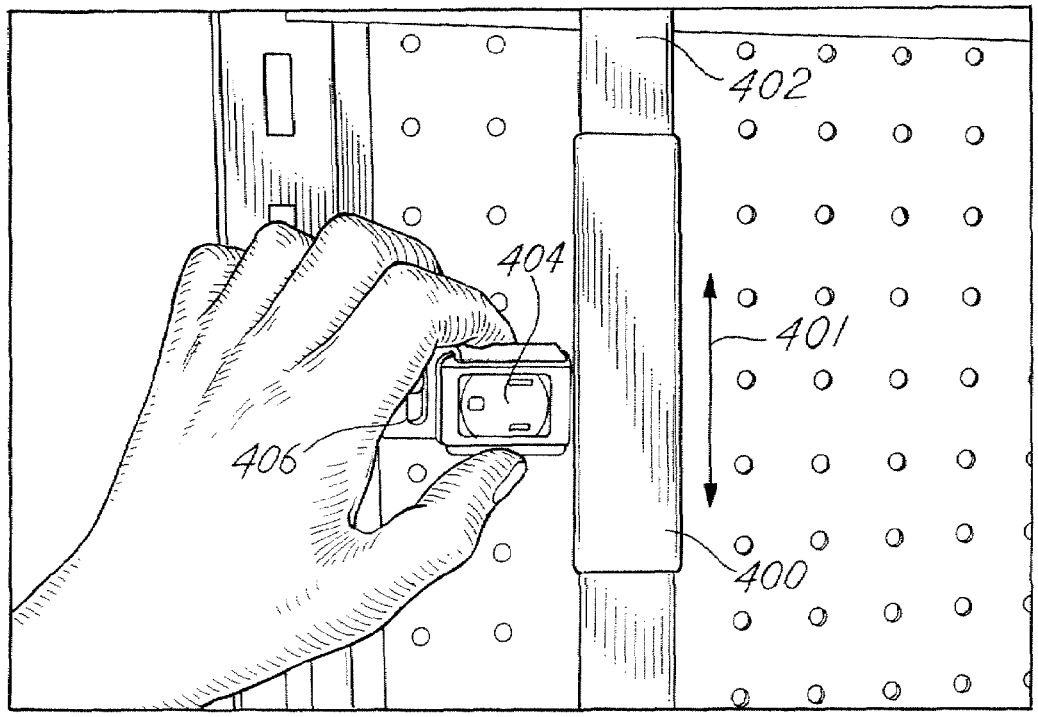
FIG. 29 depicts another view of the power bar of FIG. 28.

Referring to FIGS. 28-29, there is depicted an adjustable power bar 400 that may be selectively mounted to the back wall 106. The power bar 400 will provide electrical power to various components mounted to the shelves, including any video monitors, security cameras, lighting, illuminated signage, overhead header lights, radios, stereos, or any other components that may be mounted to a shelf or the product display and require electrical power. As illustrated by the Figures, the power bar 400 is selectively adjustable between several positions to accommodate shelf height changes or adjustments without causing obstruction with the mounting or adjustment of the shelf.

Conventionally, power outlets were mounted to the shelf and were not easily movable. In fact, significant force was required to unlock the power outlets from the track on which they were mounted to then move the power outlets. In other known applications, the power outlets were mounted to conductive tracks, similar to track-lighting tracks which included embedded power tracks. With those track-type systems, the power outlets needed to be placed at correct locations and snap-fit into position. Once installed, the power outlets were not slidable.

The power bar 400 of the invention solves these problems and other known problems by providing a power source for a product display that is easily mountable to the display, such as the back wall 106, and is easily adjustable to accommodate changes made to the positions of the shelves. The power bar 400 includes an elongated body 402 that may be attached to the back wall 106 of the display. As illustrated, the power bar 400 may be mounted in a vertical manner and the elongated body 402 may extend the entire height of the product display or alternatively less than the entire height of the product display. The power bar 400 may be slidably moved (as indicated by direction arrow 401) a sufficient distance to avoid interference with the product shelf that may be placed at approximately the same vertical height, or with the repositioning of the mounted product shelf. The power bar 400 includes one or more power outlets 404 that may be configured at numerous positions on the power bar 400. Once in the desired position, a fastener, not shown, may be positioned through an adjustment slot 406 to secure the power bar 400 to the back wall 106 at the desired height. The adjustment slot 406 is elongated to permit further adjustment of the power bar 400.

The elongated body 402 defines an elongated hollow cavity 408 through which may pass conducting wires 410 that are used to supply the power to the power bar outlets 404. The elongated body 402 may also include a recessed channel 412 formed in the body 402 and along each side of the body 402. The channel 412 may be used as a receptor for receiving and aligning the power bar 400 onto the body 402. The power bar 400 may fit on or within the channel 412 in a tongue-and-groove manner, or any other suitable mounting connection that permits slidable movement of one component relative to another. Once installed, the power bar 400 will slide relative to the body 402 in or on the channel 412.

Variations and modifications of the foregoing are within the scope of the present invention. It should be understood that the invention disclosed and defined herein extends to the individual features and all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

We claim:

1. A product management and securement system, comprising:

a first shelf and a second shelf, the first shelf having a first front edge and the second shelf having a second front edge;

a plurality of vertical walls positioned between the first and second shelf;

a plurality of pushers for urging product toward the front of the system, a retaining wall positioned adjacent the first front edge and extending toward the second shelf, the retaining wall having a height for obstructing access to the items placed between the first shelf and the second shelf; and a barrier positioned adjacent the second front edge and extending toward the first shelf, wherein the barrier is configured (a) to pivot between an open and closed position and (b) to substantially obstruct access to items placed between the first shelf and the second shelf when in the closed position, wherein the system is configured to urge the barrier to pivot toward the closed position, and, wherein the retaining wall and the barrier overlap, whereby access to items placed between the first shelf and the second shelf is substantially blocked when the barrier is in the closed position.

2. The system of claim 1, wherein at least one of the retaining wall and the barrier provides an effective wall that is sufficiently transparent so as to allow a user to see through the effective wall, whereby a user may see items placed between the first and second shelf.

3. The system of claim 1, further comprising a sensor for detecting that the barrier is not in the closed position.

4. The system of claim 1, further comprising an alert device configured to indicate that the barrier has not been in the closed position for a predetermined period of time.

5. The system of claim 4, wherein the sensor is configured to detect that the barrier is in a position selected from the list consisting of a position in between the closed and open position and the open position.

6. The system of claim 4, wherein the sensor is configured to provide a signal indicating that the barrier is not in the closed position, the system further comprising a notification device configured to provide an indication that the barrier has not been in the closed position for a predetermined time period in response to the signal received from the sensor.

7. The system of claim 1, wherein the first shelf is configured to be translatable between an open and a closed position, the open position being suitable for restocking purposes.

8. The system of claim 7, wherein the retaining wall includes a hole and the system further comprises a locking member configured to be positioned in the hole, the locking member configured to selectively lock the barrier wall in the closed position, and wherein the locking member is a key-actuated mechanism.

9. A product management and securement system, comprising:
   a display system for displaying product, the display system including a shelf with a front edge and a top wall above the shelf;
   a plurality of generally rectangular dividers positioned between the shelf and the top wall;
   a retaining wall mounted near the front edge of the shelf;
   a barrier mounted at least partially above the retaining wall, the barrier positionable between an open and a closed position, wherein the barrier includes a handle to assist in moving the barrier from the closed position to the open position, and the barrier, when in the closed position, is configured to be substantially vertical and to substantially obstruct access to the shelf;
   a sensor configured to detect that the barrier is not in the closed position and to provide a signal in response to the detection that the barrier is not in the closed position; and
   a notification device configured to be responsive to the signal and to indicate that the barrier has not been in the closed position for a predetermined time period, wherein the indication the notification device is configured to provide is an audible sound.

10. The system of claim 9, wherein the plurality of dividers substantially extend the distance between the shelf and the top wall and substantially extend to the retaining wall.

11. The system of claim 9, further comprising a spring-urged pusher positioned between two of the plurality of dividers, the pusher configured to urge items toward the front edge of the shelf.

12. The system of claim 9, wherein the sensor is configured to detect that the barrier is in the open position.

13. The system of claim 12, wherein the sensor is selected from the list consisting of a push-button switch, a motion sensor and a magnetic switch.

14. The system of claim 9, wherein the indication the notification device is configured to provide is a transmission of a signal indicating the barrier has been moved from the closed position for a predetermined time period.

15. A product management and securement system, comprising:
   a shelf with a front edge, the shelf including a plurality of tracks;
   a pusher positioned in at least one of the plurality of tracks;
   a divider positioned between at least two of the plurality of tracks;
   a top wall positioned above the shelf;
   a retaining wall;
   a barrier pivotally mounted adjacent the front edge of the shelf, the barrier pivotable between a closed position and an open position, wherein the barrier comprises a handle configured to assist in moving the barrier from the closed position to the open position and the barrier substantially blocks access to the shelf when in the closed position;
   a sensor configured to provide a signal in response to detecting that the barrier is not in the closed position; and
   a notification device, the notification device is configured to be responsive to the signal and to provide an indication that the barrier has not been in the closed position for a predetermined time period, the indication including an audible sound.

16. The system of claim 15, wherein the retaining wall is supported by the shelf and the barrier is supported by the top wall and is configured to extend toward the shelf.

* * * * *